US009609193B2

(12) United States Patent
Shintani

(10) Patent No.: US 9,609,193 B2
(45) Date of Patent: Mar. 28, 2017

(54) COMPACT INTERCHANGEABLE LENS TYPE CAMERA

(71) Applicant: Panasonic Intellectual Property Management Co., Ltd., Osaka (JP)

(72) Inventor: Dai Shintani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/866,670

(22) Filed: Sep. 25, 2015

(65) Prior Publication Data

US 2016/0021286 A1     Jan. 21, 2016

Related U.S. Application Data

(63) Continuation of application No. PCT/JP2013/005210, filed on Sep. 3, 2013.

(30) Foreign Application Priority Data

Mar. 27, 2013   (JP) .................................. 2013-065661

(51) Int. Cl.
*H04N 5/225*     (2006.01)
*G03B 17/02*     (2006.01)
(Continued)

(52) U.S. Cl.
CPC .............. *H04N 5/2256* (2013.01); *G03B 9/08* (2013.01); *G03B 9/40* (2013.01); *G03B 17/02* (2013.01);
(Continued)

(58) Field of Classification Search
CPC .... H04N 5/2256; H04N 5/374; H04N 5/2253; H04N 5/2254; H04N 5/23209;
(Continued)

(56) References Cited

U.S. PATENT DOCUMENTS

| 5,325,148 | A | * | 6/1994 | Katagiri | ................. G03B 7/093 |
| | | | | | 396/246 |
| 5,463,438 | A | | 10/1995 | Kosako | |
| 5,619,737 | A | * | 4/1997 | Horning | .................. G03B 7/26 |
| | | | | | 396/195 |
| 5,867,742 | A | | 2/1999 | Salvas et al. | |

(Continued)

FOREIGN PATENT DOCUMENTS

| JP | 2010-060675 A | 3/2010 |
| JP | 2012-123136 A | 6/2012 |
| JP | 2012-128244 A | 7/2012 |

OTHER PUBLICATIONS

International Search Report issued in International Application No. PCT/JP2013/005210, mailed Dec. 10, 2013, with English Translation.

*Primary Examiner* — Gevell Selby
(74) *Attorney, Agent, or Firm* — McDermott Will & Emery LLP

(57) ABSTRACT

A camera body includes a body mount to which an interchangeable lens is attachable; a CMOS image sensor; a main circuit board; and a mechanical shutter provided with an aperture. The main circuit board is disposed between the body mount and the CMOS image sensor, and an opening through which light from the interchangeable lens toward the CMOS image sensor passes is formed in the main circuit board. The mechanical shutter is disposed between the body mount and the CMOS image sensor, and is attached to the main circuit board.

9 Claims, 19 Drawing Sheets

(51) Int. Cl.
*G03B 17/14* (2006.01)
*H04N 5/232* (2006.01)
*G03B 9/40* (2006.01)
*G03B 9/08* (2006.01)
*H04N 5/374* (2011.01)
*H04N 5/361* (2011.01)

(52) U.S. Cl.
CPC ............ *G03B 17/14* (2013.01); *H04N 5/2253* (2013.01); *H04N 5/2254* (2013.01); *H04N 5/23209* (2013.01); *H04N 5/361* (2013.01); *H04N 5/374* (2013.01); *G03B 2217/002* (2013.01)

(58) Field of Classification Search
CPC . G03B 9/08; G03B 9/40; G03B 17/02; G03B 17/14; G03B 2217/002
See application file for complete search history.

(56) References Cited

U.S. PATENT DOCUMENTS

| | | | |
|---|---|---|---|
| 6,394,668 B1* | 5/2002 | Nakano | G03B 9/08 396/464 |
| 6,628,339 B1* | 9/2003 | Ferland | H04N 5/2253 257/433 |
| 7,499,636 B2* | 3/2009 | Feng | H04N 5/23212 348/224.1 |
| 8,184,965 B2* | 5/2012 | Hayashi | H04N 5/23232 396/55 |
| 2004/0223758 A1 | 11/2004 | Nakano et al. | |
| 2005/0174466 A1 | 8/2005 | Tanaka et al. | |
| 2010/0027987 A1 | 2/2010 | Tanaka et al. | |
| 2011/0164171 A1 | 7/2011 | Yasuda et al. | |
| 2011/0317062 A1* | 12/2011 | Fujino | H04N 5/23209 348/360 |
| 2012/0008043 A1 | 1/2012 | Yasuda et al. | |

* cited by examiner

COMPACT INTERCHANGEABLE LENS TYPE CAMERA

CROSS-REFERENCE TO RELATED APPLICATION

This application is a continuation of International Application No. PCT/JP2013/005210, filed on Sep. 3, 2013, which in turn claims priority to Japanese Patent Application No. 2013-065661 filed on Mar. 27, 2013, the entire disclosures of which are incorporated by reference herein.

BACKGROUND

The technique disclosed herein relates to an imaging apparatus.

Japanese Patent Publication No. 2012-123136 discloses an interchangeable lens type camera. In the camera disclosed in Japanese Patent Publication No. 2012-123136, a mirror box device is not provided, and therefore, a compact structure is realized.

SUMMARY

For cameras, further reduction in size has been required. However, in the interchangeable lens type camera as in Japanese Patent Publication No. 2012-123136, the distance (so-called "flange focal distance") between a body mount and an imaging device is optically determined. Thus, the degree of freedom in arrangement of each component is low, and it is difficult to reduce the camera size.

The technique disclosed herein provides a compact interchangeable lens type camera.

An imaging apparatus disclosed herein includes a body mount to which an interchangeable lens is attachable; an imaging device; a circuit board; and a shutter unit provided with an aperture. The circuit board is disposed between the body mount and the imaging device, and an opening part or a cut part through which light from the interchangeable lens toward the imaging device passes is formed in the circuit board. The shutter unit is disposed between the body mount and the imaging device, and is attached to the circuit board.

According to the above-described technique, a compact interchangeable lens type camera can be provided.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor(s) provides the following description and the attached drawings to enable those skilled in the art to fully understand the present disclosure. Thus, the description and the drawings are not intended to limit the scope of the subject matter defined in the claims.

Example embodiments will be described in detail below with reference to drawings.

<<First Embodiment>>

(1-1. Summary of Camera System)

Figure 1:
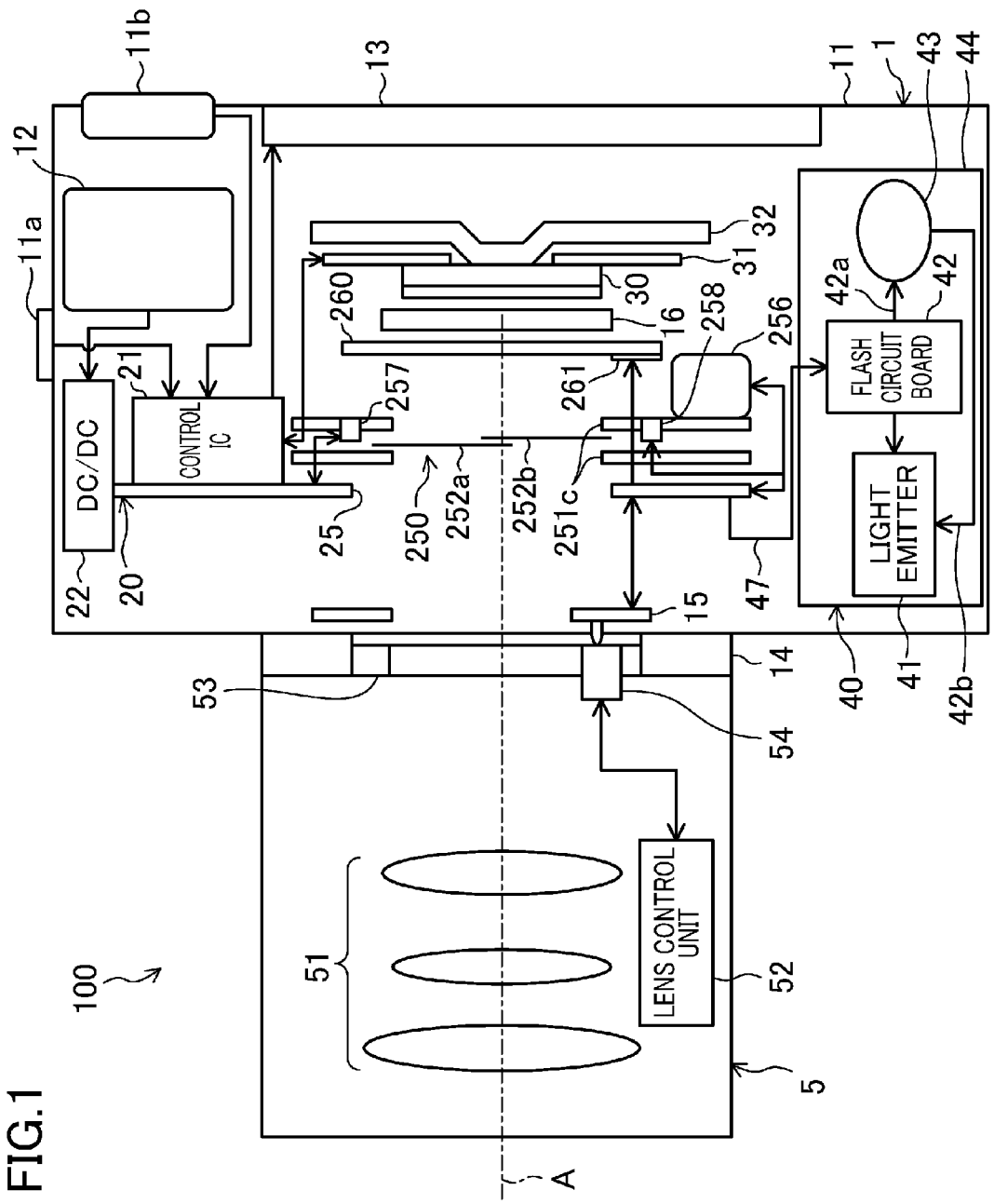
FIG. 1 is a block diagram of a camera system of a first embodiment.
Figure 2:
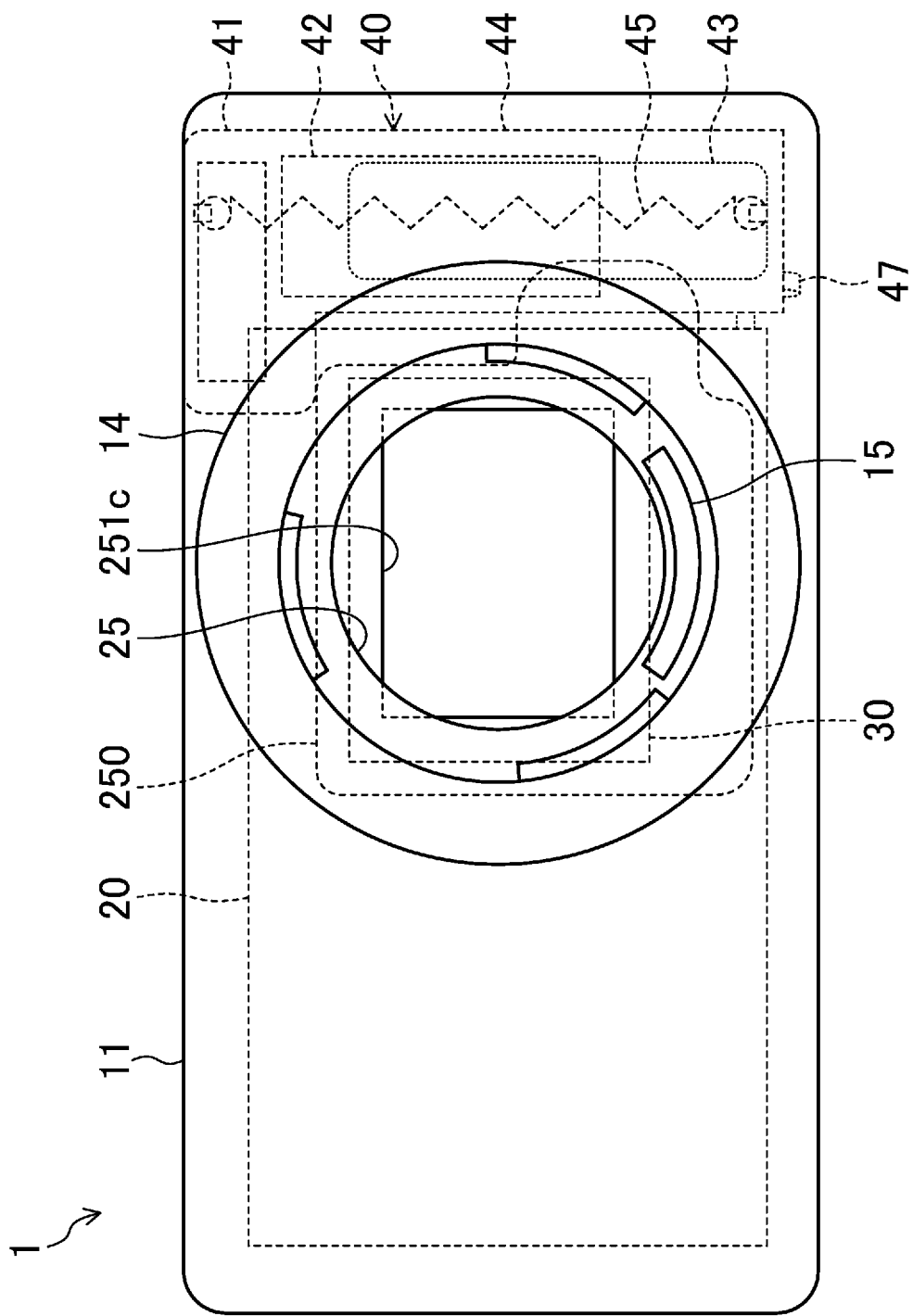
FIG. 2 is a front view of a camera body.
Figure 3:
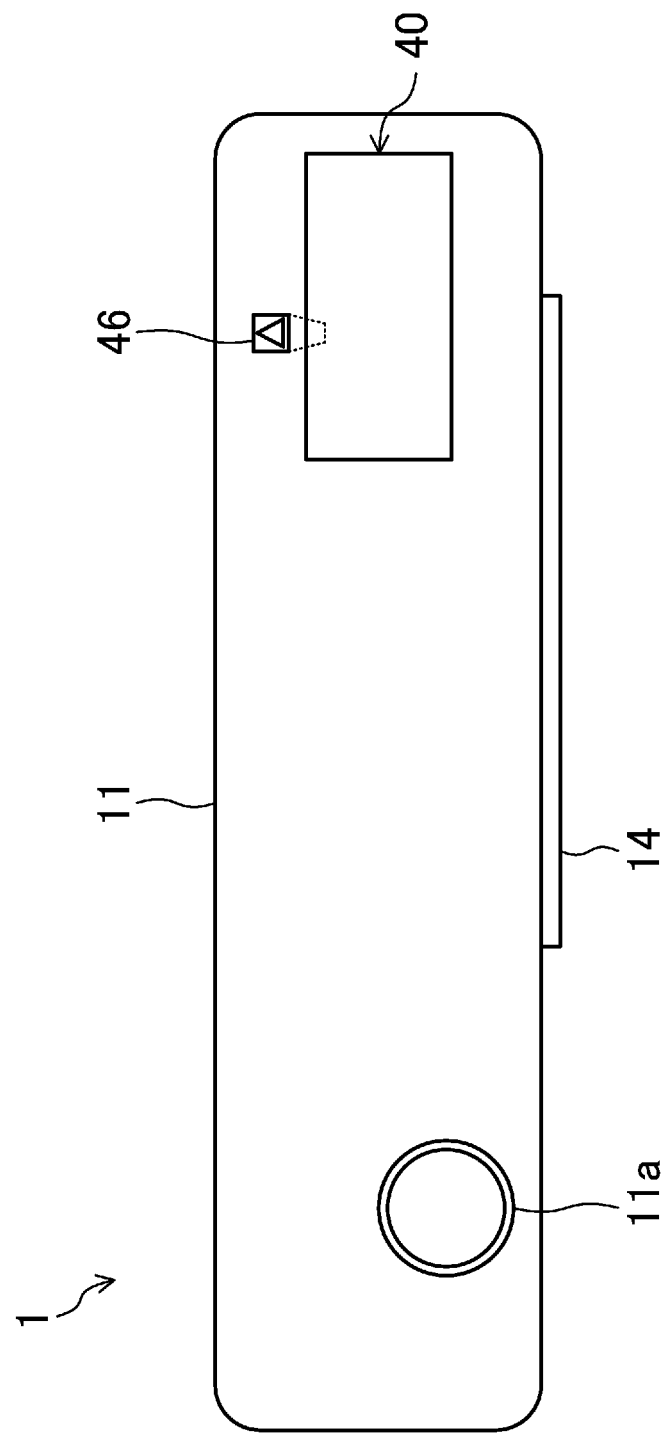
FIG. 3 is a plan view of the camera body.
Figure 4:
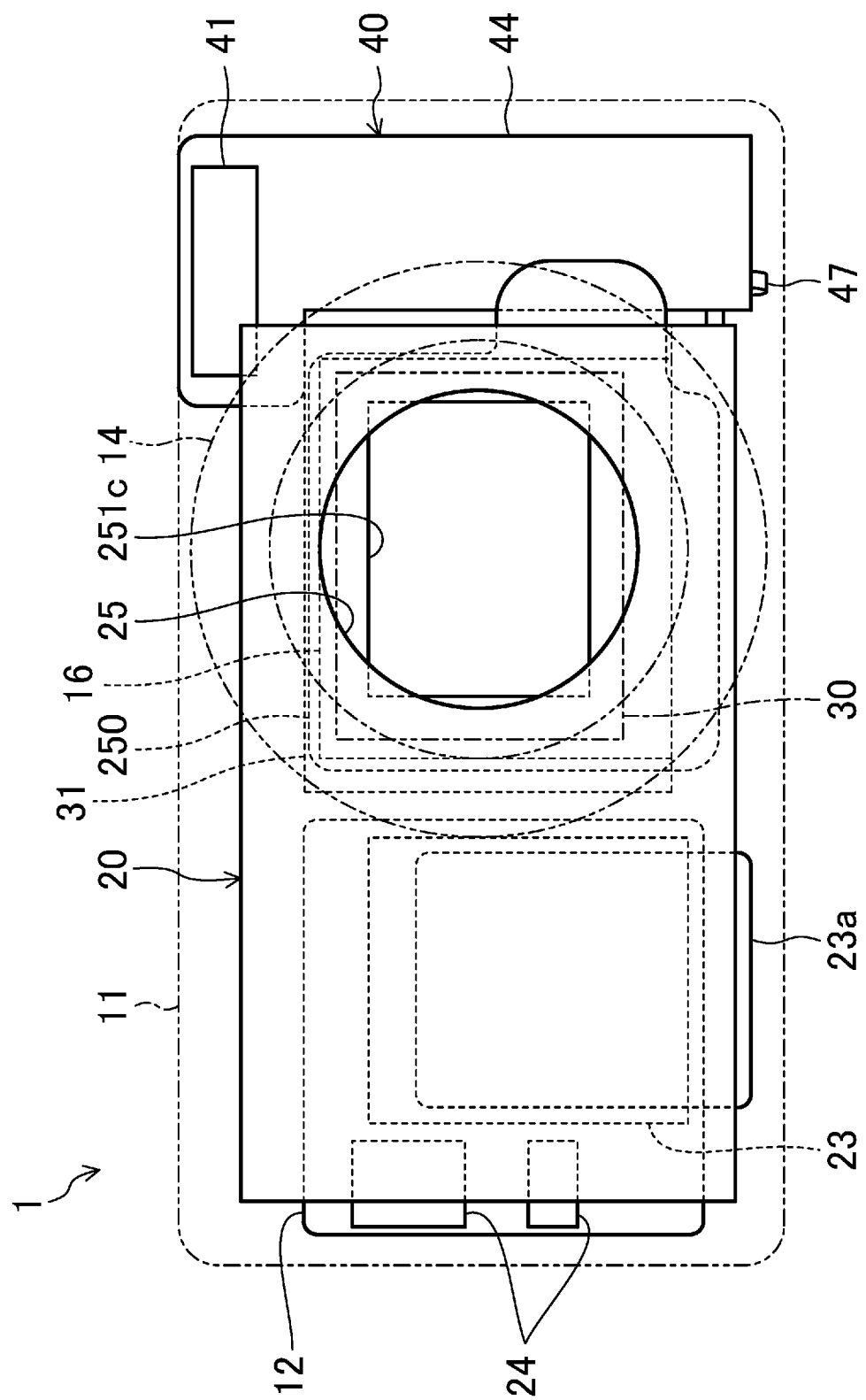
FIG. 4 is a view of an internal structure of the camera body from the front.
Figure 5:
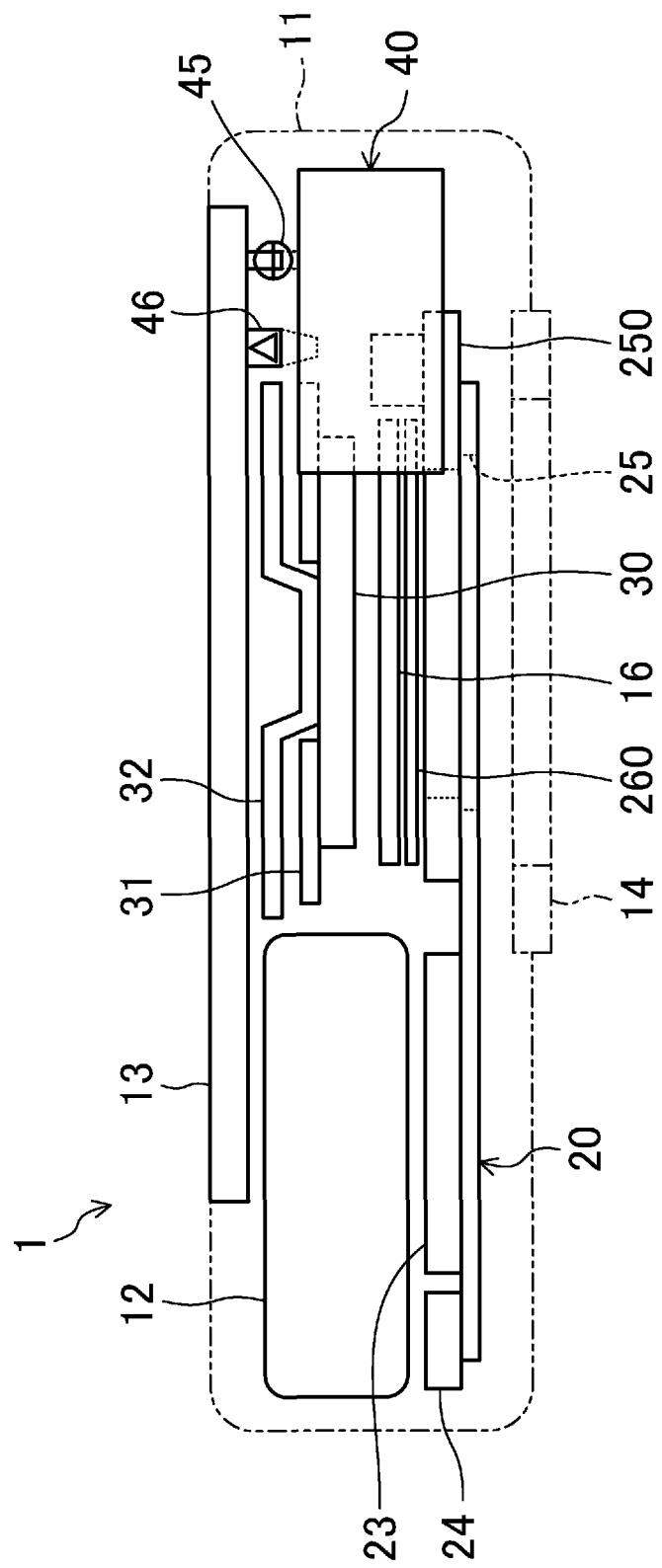
FIG. 5 is a view of the internal structure of the camera body from the above.
Figure 6:
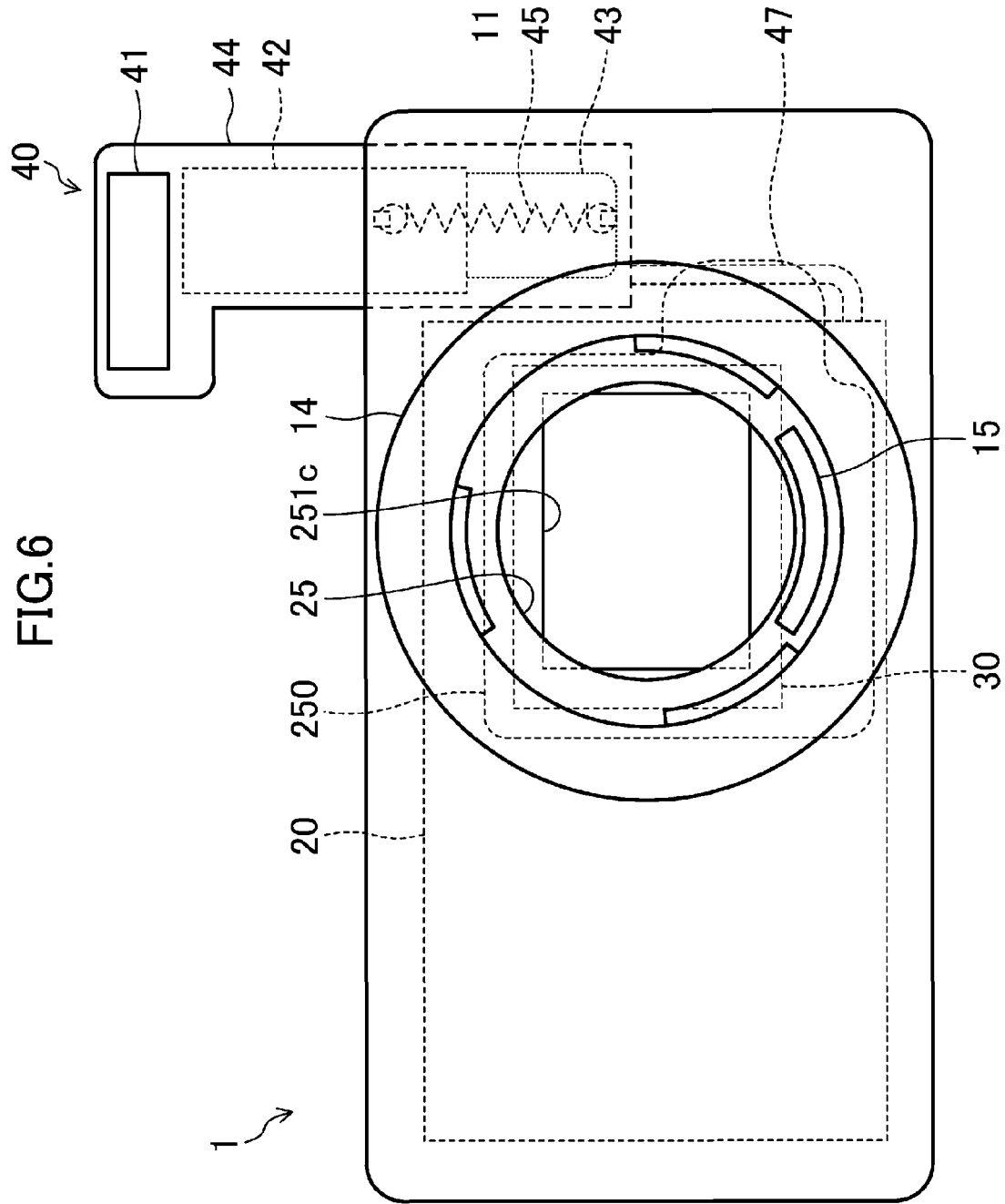
FIG. 6 is a plan view of the camera body in the state in which a flash device is popped up.

FIG. 1 is a block diagram of a camera system 100 of a first embodiment. FIG. 2 is a front view of a camera body 1. FIG. 3 is a plan view of the camera body 1. FIG. 4 is a view of an internal structure of the camera body 1 from the front. FIG. 5 is a view of the internal structure of the camera body 1 from the above. FIG. 6 is a front view of the camera body 1 in the state in which a flash device 40 is popped up.

The camera system 100 is an interchangeable lens type camera. The camera system 100 includes the camera body 1 and an interchangeable lens 5 detachably attached to the camera body 1. The camera body 1 is an example of an imaging apparatus.

The camera body 1 is a so-called "mirrorless camera" which does not include a mirror box device. For the sake of simplicity of description, a side close to an object is hereinafter referred to as a "front," a side close to an imaging surface is hereinafter referred to as a "rear," an upper side of the camera body 1 in the vertical direction in a normal attitude is hereinafter referred to as an "upper," a lower side of the camera body 1 in the vertical direction in the normal attitude is hereinafter referred to as a "lower," a left side when the camera body 1 in the normal attitude is viewed from the side close to the object is hereinafter referred to as a "left," and a right side when the camera body 1 in the normal attitude is viewed from the side close to the object is hereinafter referred to as a "right." The normal attitude of the camera body 1 is the attitude in which a long-side direction of the imaging surface of the camera body 1 is coincident with the horizontal direction and a short-side direction of the imaging surface of the camera body 1 is coincident with the vertical direction.

The camera body 1 includes an outer cover 11, a battery 12, a display device 13, a body mount 14, a camera body-side contact 15, a main circuit board 20, a mechanical shutter 250, a dust filter 260, an optical low-pass filter 16, a CMOS image sensor 30, a CMOS circuit board 31, a heat sink 32, and the flash device 40.

The outer cover 11 serves as an outer package of the camera body 1. The outer cover 11 is in a substantially parallelepiped rectangular shape. Referring to FIG. 3, a shutter button 11a is provided on an upper surface of the outer cover 11. The shutter button 11a is a two-stage switch. For example, the shutter button 11a is pressed halfway down to perform autofocusing, whereas the shutter button 11a is pressed all the way down (i.e., the shutter button 11a is completely pressed down) to perform shooting. The display device 13 and an operation button 11b for various user operations are provided on a rear surface of the outer cover 11.

Referring to FIG. 2, the body mount 14 is provided on a front surface of the outer cover 11. The camera body-side contact 15 is provided near the body mount 14. The interchangeable lens 5 is attached to the body mount 14 by bayonet connection. That is, the body mount 14 detachably holds the interchangeable lens 5. In such a state, a lens-side contact 54 which will be described later is electrically connected to the camera body-side contact 15. Date and/or control signals can be transmitted/received between the camera body 1 and the interchangeable lens 5 through the camera body-side contact 15 and the lens-side contact 54. Note that the camera body-side contact 15 may be provided at the body mount 14.

The battery 12, the optical low-pass filter 16, the main circuit board 20, the CMOS image sensor 30, the CMOS circuit board 31, the heat sink 32, and the flash device 40 are housed in the outer cover 11.

Referring to FIG. 1, the interchangeable lens 5 includes a lens group 51, an electric zoom actuator configured to drive at least one lens of the lens group 51 engaged in zooming, a focus actuator configured to drive at least one lens of the lens group 51 engaged in focusing, a blur correction unit configured to drive at least one lens of the lens group 51 engaged in blur correction, a diaphragm unit, a lens control circuit 52, a lens mount 53 connected to the camera body 1, and the lens-side contact 54. The electric zoom actuator, the focus actuator, the blur correction unit, and the diaphragm unit are not shown in the figure. The lens group 51 has an optical axis A. The lens group 51 is configured to form an image of an object on the imaging surface (light receiving surface) of the CMOS image sensor 30.

The interchangeable lens 5 is attached to the camera body 1 through the lens mount 53. Specifically, the lens mount 53 is connected to the body mount 14 of the camera body 1 by bayonet connection. In such a state, the lens-side contact 54 is electrically connected to the camera body-side contact 15 of the camera body 1. The lens control circuit 52 is configured to control the electric zoom actuator, the focus actuator, the blur correction unit, and the diaphragm unit.

(1-2. Components of Camera Body)

The CMOS image sensor 30 is configured to convert an optical image formed on the imaging surface into an electric image signal. The CMOS image sensor 30 is an example of an imaging device. The imaging device may be, e.g., a CCD image sensor. The CMOS image sensor 30 has an electronic shutter function. More specifically, the CMOS image sensor 30 functions as a rolling shutter. When the CMOS image sensor 30 functions as a rolling shutter, one to several scanning lines of pixels are grouped as a single block, and the pixels in each block simultaneously begin charge storage and simultaneously end the charge storage.

The CMOS circuit board 31 is a circuit board configured to control the CMOS image sensor 30. The CMOS circuit board 31 may apply predetermined processing such as AD conversion to image data output from the CMOS image sensor 30. The CMOS image sensor 30 is attached to the CMOS circuit board 31.

The heat sink 32 functions to dissipate heat generated from the CMOS image sensor 30. The heat sink 32 is fixed in close contact with the CMOS image sensor 30. The heat sink 32 is attached to three bosses (not shown in the figure) provided in the outer cover 11. When the heat sink 32 is attached to the bosses, the distance from the body mount 14 is adjustable. Thus, the distance between the body mount 14 and the imaging surface of the CMOS image sensor 30, i.e., the flange focal distance, can be adjusted at a predetermined value.

The display device 13 includes a liquid crystal display. The display device 13 is configured to display, e.g., an image corresponding to display image data. The display image data is image data for which image processing is performed and data on shooting conditions and an operation menu of the camera body 1. The display device 13 is capable of selectively displaying a video picture and a still image. The display device 13 is also capable of displaying an observation image of an object, i.e., a so-called "live-view image." The display device 13 is an example of a display.

Note that the display may be a device which is capable of displaying an image, such as organic EL displays, inorganic EL displays, and plasma displays. Moreover, the display device 13 may be provided not on the rear surface of the outer cover 11 but on other parts of the outer cover 11 such as a side surface or an upper surface thereof.

Although will be described in detail later, the mechanical shutter 250 selectively performs the operation for opening an aperture or the operation for closing the aperture by a single curtain unit, and can selectively function as a front curtain or a rear curtain.

The optical low-pass filter 16 is configured to remove a high spatial frequency part from incident light. Specifically, the optical low-pass filter 16 separates incident light such that the resolution of an object image is lowered as compared to that of the CMOS image sensor 30. Typically in imaging devices such as CMOS image sensors, a color filter called "bayer arrangement" and having the colors of RGB or a complementary color filter having the colors of YCM are provided. If there is a one-to-one pixel correspondence between the imaging device and an object image, not only false color occurs, but also moire phenomenon occurs in an object of repeated patterns. The optical low-pass filter 16 is provided to reduce occurrence of false color and moire phenomenon. The optical low-pass filter 16 is an example of an optical filter.

The optical low-pass filter 16 also has an IR cut filter function for removing infrared light.

If the pixel size of the CMOS image sensor 30 is extremely small and false color and moire phenomenon are less likely to occur, the optical low-pass filter 16 is not necessarily provided.

The dust filter 260 includes a piezoelectric element 261. The dust filter 260 is configured to vibrate the piezoelectric element 261 to remove a foreign substance(s) influencing a captured image, such as dust. Note that the optical low-pass filter 16 may have the function of the dust filter 260 without providing the dust filter 260. For example, a piezoelectric element is attached to part of the optical low-pass filter 16 which has no influence on shooting, and the piezoelectric element is vibrated. As a result, dust and dirt adhered to the optical low-pass filter 16 drop.

A control IC 21, a DC/DC converter 22, a recordable media socket 23, and various I/O sockets 24 are mounted on the main circuit board 20. The control IC 21 is responsible for control of the entirety of the camera body 1, and performs, e.g., control of the camera body 1 for shooting. The control IC 21 is an example of a controller. Note that any physical configuration of the controller may be employed as long as the controller controls the camera system 100 or the camera body 1. For example, the controller may be a programmable microcomputer. The controller may be implemented by hard-wired logic. The controller may be formed of a single physical component or a plurality of physical components. If the controller is formed of the plurality of physical components, it is conceivable that such physical components form a single controller. An element having a function different from that of the controller may be integrated with the controller to form a single component. The DC/DC converter 22 is configured to convert voltage output from the battery 12 into voltage corresponding to each device and to output the converted voltage. That is, the battery 12 supplies power to the camera body 1 and the interchangeable lens 5 through the DC/DC converter 22. Recordable media 23a can be inserted into the recordable media socket 23. The main circuit board 20 is an example of a circuit board.

The flash device 40 is housed in a right end part of the outer cover 11 so as to be popped up. Since the flash device 40 can be popped, shading of flash light due to the interchangeable lens 5 is reduced.

(1-3. Arrangement and Configuration of Main Circuit Board)

Referring to FIGS. 1 and 5, the body mount 14, the camera body-side contact 15 (not shown in FIG. 5), the main circuit board 20, the mechanical shutter 250, the dust filter 260, the optical low-pass filter 16, the CMOS image sensor 30, the CMOS circuit board 31, and the heat sink 32 are, in this order from the front, arranged on the optical axis A of the camera body 1. That is, the main circuit board 20 is disposed between the body mount 14 and the CMOS image sensor 30. Thus, a space in front of the CMOS image sensor 30 can be effectively used, resulting in narrowing of a space in rear of the CMOS image sensor 30. As a result, the thickness of the camera body 1 can be reduced. More specifically, the main circuit board 20 is provided at a position closer to the body mount 14 relative to the CMOS image sensor 30. The mechanical shutter 250 is also disposed between the body mount 14 and the CMOS image sensor 30. Thus, the influence of the mechanical shutter 250 on the thickness of the camera body 201 can be reduced.

Referring to FIGS. 2 and 5, when the CMOS image sensor 30 is viewed from a side close to the body mount 14 in an optical axis direction, the main circuit board 20 laterally extends (e.g., extends toward the left) beyond the body mount 14. A circular opening 25 through which light passes after passing through the interchangeable lens 5 is formed in the main circuit board 20. The size of the opening 25 is set such that light passing through the interchangeable lens 5 and then entering the imaging surface of the CMOS image sensor 30 is not blocked. Even in the configuration in which the main circuit board 20 is disposed in front of the CMOS image sensor 30, the opening 25 is formed in the main circuit board 20, and therefore, blocking of light passing through the interchangeable lens 5 and then entering the imaging surface of the CMOS image sensor 30 can be reduced or prevented.

Note that the shape of the opening 25 is not limited to the circular shape. The opening 25 can be formed in any shapes as long as light passing through the interchangeable lens 5 and then entering the imaging surface of the CMOS image sensor 30 is not blocked.

The main circuit board 20 is disposed at a front end inside the outer cover 11. Thus, a space in which the battery 12 is disposed can be provided in rear of the main circuit board 20 and at the side (specifically at the left side) of, e.g., the CMOS image sensor 30. Moreover, since the main circuit board 20 is disposed at the front end inside the outer cover 11 and the battery 12 is disposed on the rear side relative to the main circuit board 20, the degree of freedom in shape of the outer cover 11 can be improved. Specifically, there is the following need. Considering usability or design of the camera body 1, a ridge part formed between the front surface and the side surface of the outer cover 11 is formed not in an angular shape but in a curved shape. On the other hand, an increase in size of the battery 12 is required in order to ensure a capacity. Thus, in the configuration in which the battery 12 is disposed in a side end part of the outer cover 11 on the front side thereof, it is, in order to ensure the arrangement space of the battery 12, inevitable that the ridge part formed between the front surface and the side surface of the outer cover 11 is in the angular shape. In contrast, in the outer cover 11, the main circuit board 20 does not necessarily extend to the side surface of the outer cover 11. Thus, the main circuit board 20 is disposed at the front end inside the outer cover 11, and therefore, the ridge part formed between the front surface and the side surface of the outer cover 11 can be formed in the curved shape. For example, the curvature of a ridge part formed between the front surface and the left side surface of the outer cover 11 can be smaller than that of a ridge part formed between the rear surface and the left side surface of the outer cover 11.

Note that a rear surface of the battery 12 and a rear surface of the heat sink 32 is substantially flush with each other. The thickness of the camera body 1 is determined by the body mount 14, the camera body-side contact 15, the main circuit board 20, the optical low-pass filter 16, the CMOS image sensor 30, the CMOS circuit board 31, the heat sink 32, and the display device 13.

(1-4. Detailed Configuration of Flash Device)

Referring to FIGS. 1 and 2, the flash device 40 includes a light emitter 41, a flash circuit board 42, a main capacitor 43, a first electric wire 42a (not shown in FIG. 2) configured to electrically connect the flash circuit board 42 and the main capacitor 43 together, a second electric wire 42b (not shown in FIG. 2) configured to electrically connect the main capacitor 43 and the light emitter 41 together, and a casing 44. The light emitter 41 includes a xenon arc tube and a trigger coil which are not shown in the figure. The flash circuit board 42 includes an electric circuit. The flash circuit board 42 is configured to control the light emitter 41 and the main capacitor 43. Specifically, the flash circuit board 42 boosts voltage supplied from the main circuit board 20, and then supplies the boosted voltage to the main capacitor 43 through the first electric wire 42a. Moreover, the flash circuit board 42 outputs a trigger signal to the light emitter 41. When power is supplied to the trigger coil by the trigger signal output from the flash circuit board 42, charge stored in the main capacitor 43 is supplied to the light emitter 41 through the second electric wire 42b. Then, discharge is generated between both terminals of the xenon tube of the light emitter 41, thereby emitting flash light. The main capacitor 43 is an example of a capacitor.

Referring to FIGS. 2 and 6, the light emitter 41, the flash circuit board 42, and the main capacitor 43 are housed in the casing 44. Referring to FIG. 4, part of the light emitter 41 is exposed through the casing 44 so that flash light can be emitted to the outside. The casing 44 is a fire enclosure. That is, the casing 44 is made of flame-retardant resin (having flame resistance of UL 94 V-0 grade or more). The first electric wire 42a between the flash circuit board 42 and the main capacitor 43 and the second electric wire 42b between the main capacitor 43 and the light emitter 41 are high voltage wires through each of which current flows at relatively-high voltage. The first electric wire 42a and the second electric wire 42b are also housed in the casing 44.

The casing 44 is supported by the outer cover 11 through guides (not shown in the figure) so as to be vertically slide. The casing 44 can move between a housing position at which the casing 44 is completely housed in the outer cover 11 and a pop-up position at which the casing 44 upwardly protrudes from the outer cover 11. Referring to FIGS. 2 and 6, the casing 44 is biased upward by a biasing spring 45, i.e., is biased toward the pop-up position by the biasing spring 45. The biasing spring 45 is, at one end thereof, connected to a lower part of the casing 44. The biasing spring 45 is, at the other end thereof, connected to an upper part of the outer cover 11. When the casing 44 is at the housing position, the biasing spring 45 is pulled, and upward biasing force acts on the casing 44. In the outer cover 11, a hook member 46 configured to hold the casing 44 at the housing position against biasing force of the biasing spring 45 is provided. The hook member 46 is provided in the upper part of the outer cover 11. The hook member 46 can move between an engagement position at which, when the casing 44 is at the housing position, the hook member 46 is engaged with the casing 44 to hold the casing 44 at the housing position and a disengagement position at which the hook member 46 is disengaged from the casing 44. An operation part for the hook member 46 is exposed through the outer cover 11, and therefore, a user can operate the hook member 46. That is, when the casing 44 is at the housing position, the casing 44 is, by the hook member 46, held at the housing position against biasing force of the biasing spring 45 in such a manner that the hook member 46 is placed at the engagement position. When the hook member 46 moves from such a position to the disengagement position, the casing 44 moves to the pop-up position by biasing force of the biasing spring 45.

As described above, the light emitter 41, the flash circuit board 42, and the main capacitor 43 move together between the housing position and the pop-up position with such components being housed in the casing 44. In such a state, the first electric wire 42a between the flash circuit board 42 and the main capacitor 43 and the second electric wire 42b between the main capacitor 43 and the light emitter 41 also move together with such components being housed in the casing 44.

The flash device 40 is connected to the main circuit board 20 through a flexible printed circuit board (hereinafter referred to as a "FPC board") 47. An electric wire of the FPC board 47 is an example of a third electric wire.

The FPC board 47 is configured to be deformed in accordance with movement of the casing 44 when the casing 44 moves between the housing position and the pop-up position. Current flowing between the flash circuit board 42 and the main circuit board 20 is lower than current flowing between the flash circuit board 42 and the main capacitor 43 and current flowing between the main capacitor 43 and the light emitter 41. For such a reason, the electric wire of the FPC board 47 is a low voltage wire, and has a smaller width than those of the first electric wire 42a between the flash circuit board 42 and the main capacitor 43 and the second electric wire 42b between the main capacitor 43 and the light emitter 41.

(1-5. Configuration of Mechanical Shutter)

Figure 7:
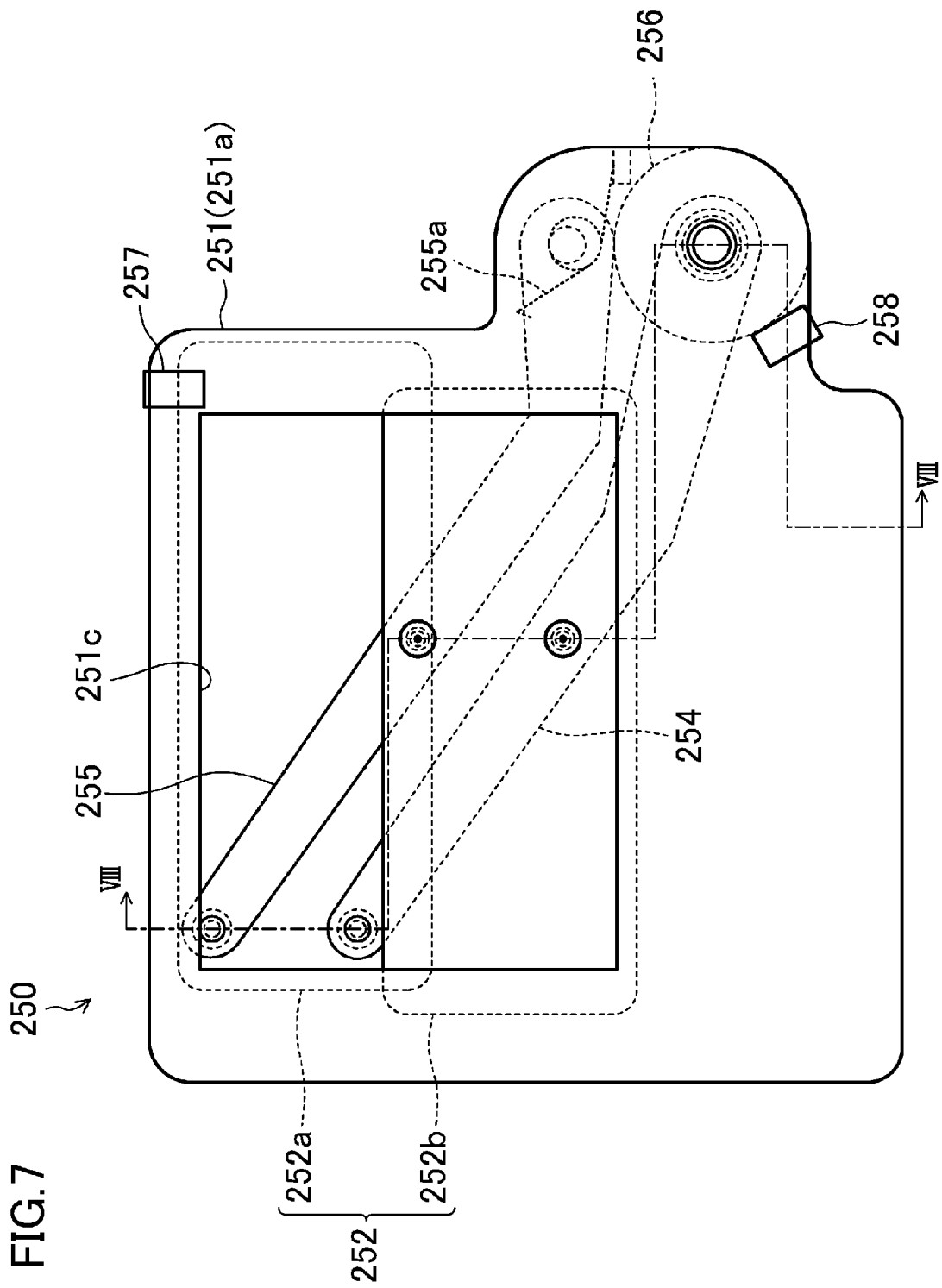
FIG. 7 is a front view of a mechanical shutter in a closed state.
Figure 8:
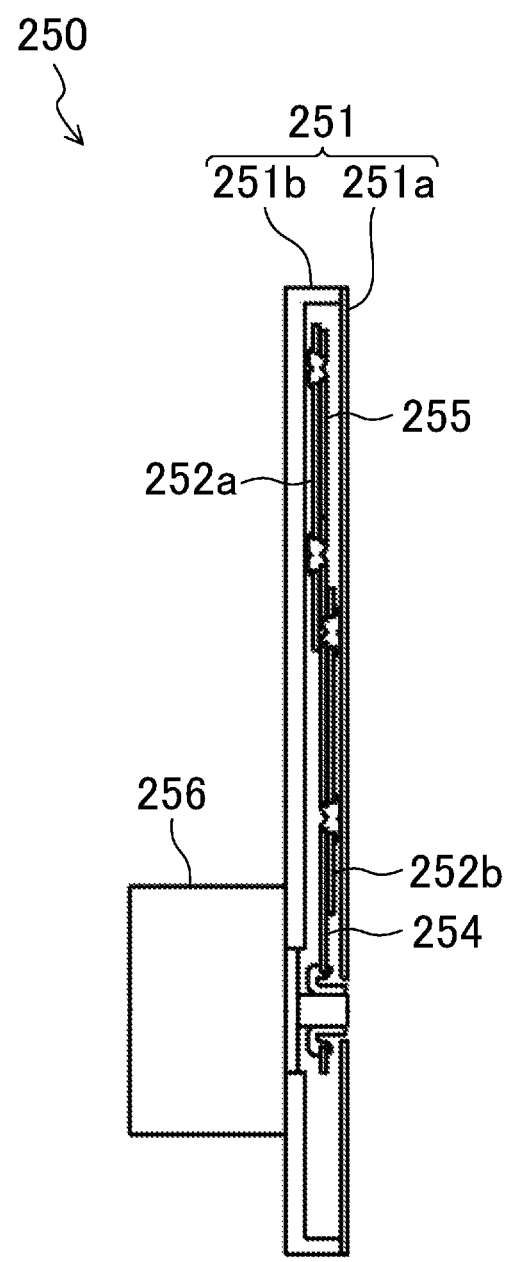
FIG. 8 is a cross-sectional view of the mechanical shutter along a VIII-VIII line illustrated in FIG. 7.
Figure 9:
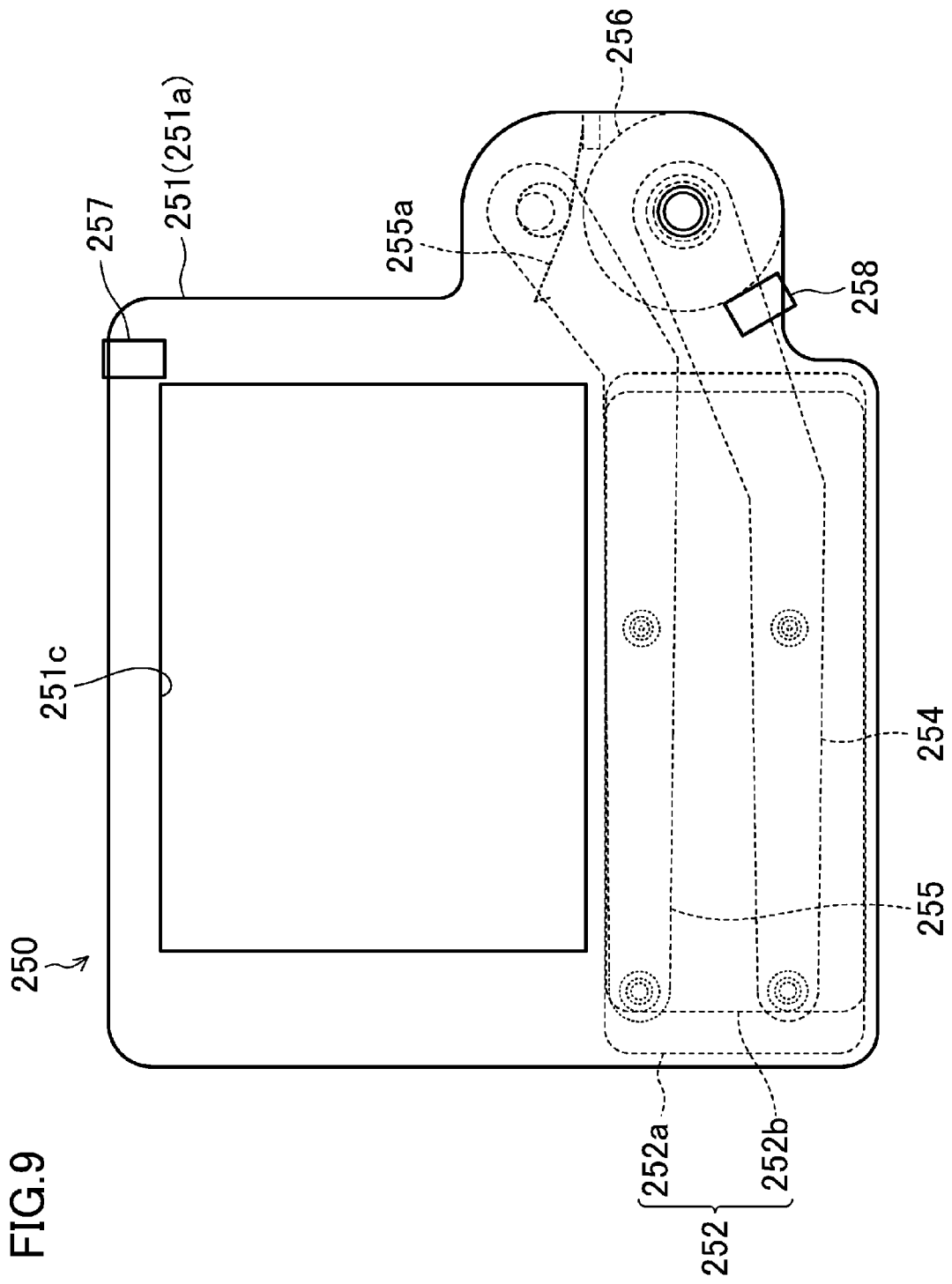
FIG. 9 is a front view of the mechanical shutter in an open state.
Figure 10A:
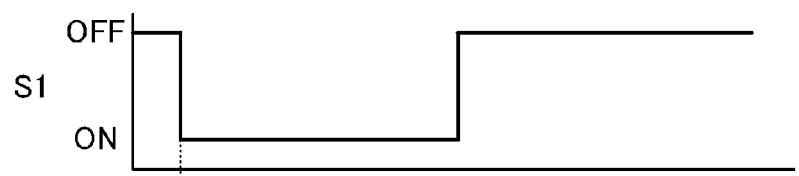
FIGS. 10A-10D are time charts for shooting control in normal sensitivity shooting.
Figure 10B:
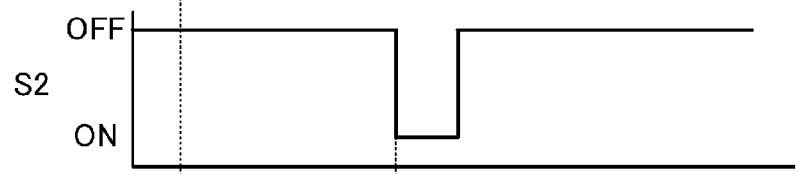
Figure 10C:
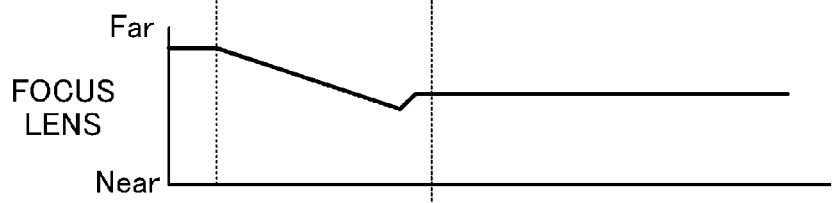
Figure 10D:
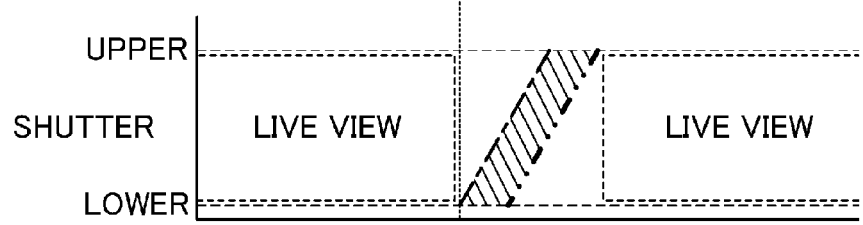
Figure 11A:
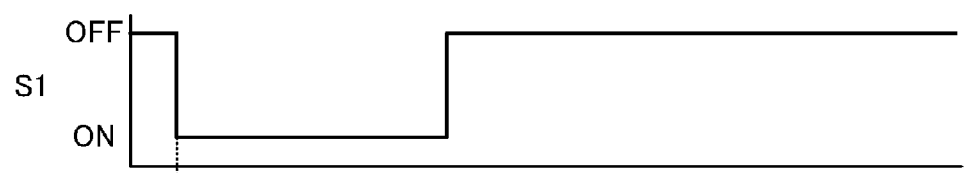
FIGS. 11A-11D are time charts for shooting control in dark current noise correction.
Figure 11B:
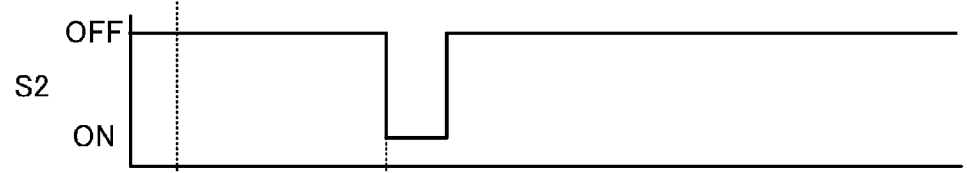
Figure 11C:
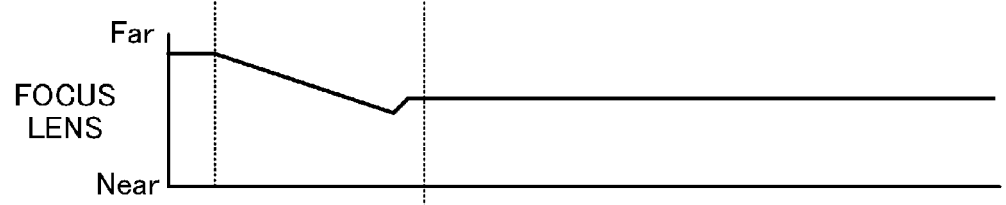
Figure 11D:
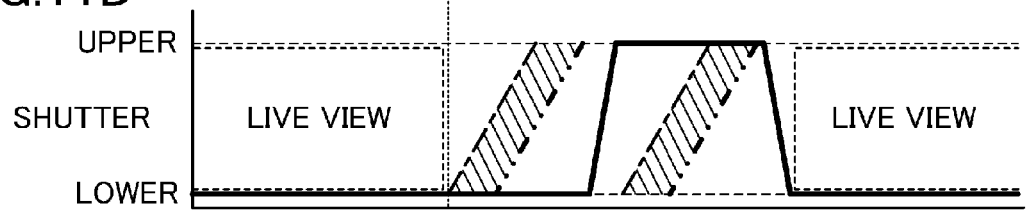
Figure 12A:
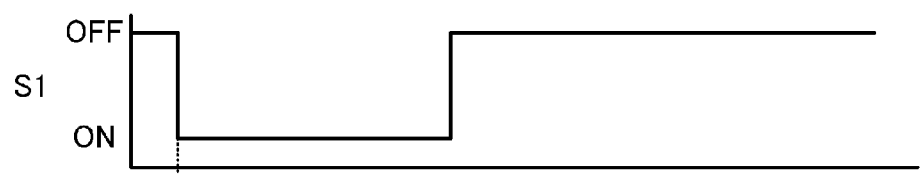
FIGS. 12A-12E are time charts for shooting control in normal shooting using flash.
Figure 12B:
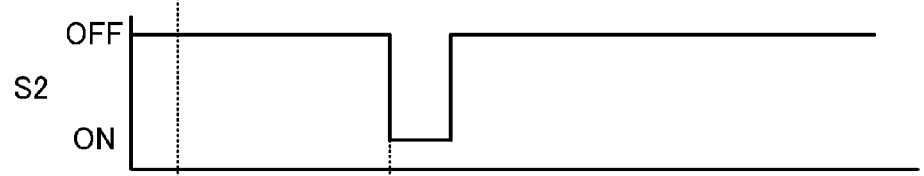
Figure 12C:
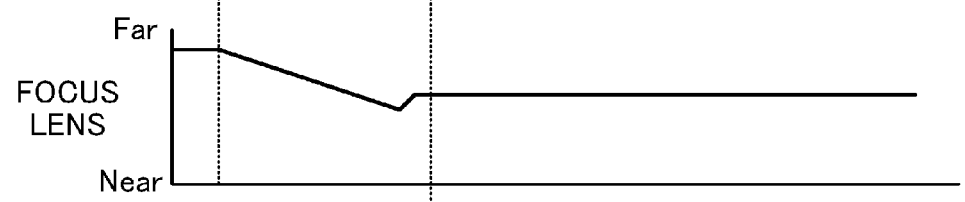
Figure 12D:
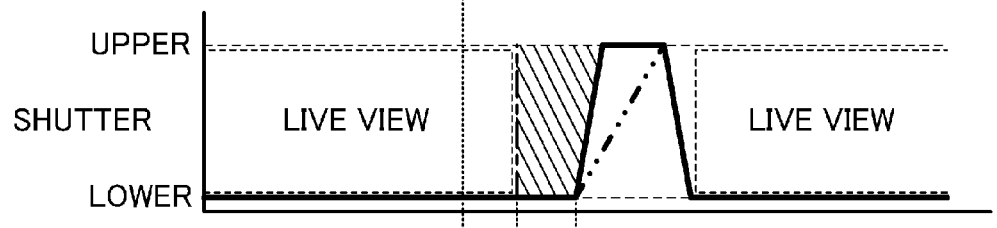
Figure 12E:
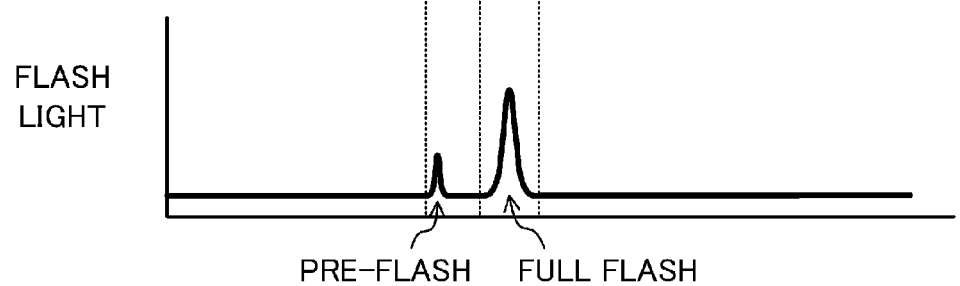
Figure 13A:
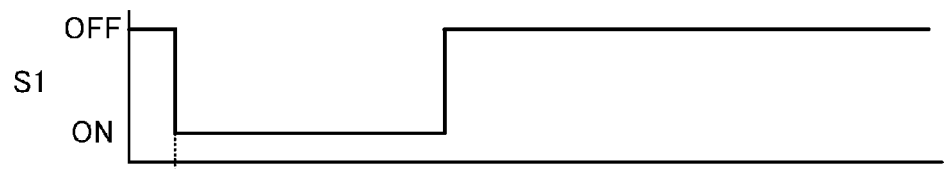
FIGS. 13A-13E are time charts for shooting control in shooting using slow synchronization.
Figure 13B:
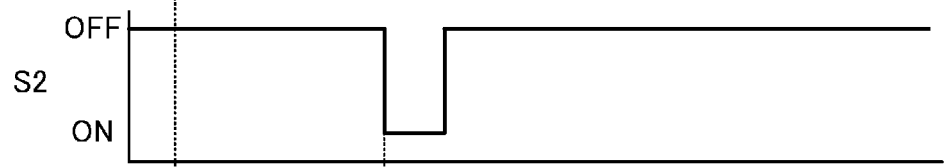
Figure 13C:
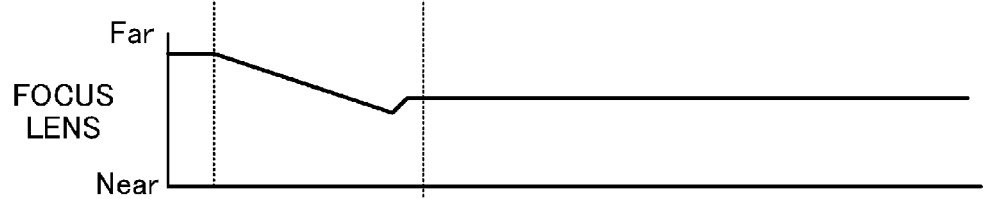
Figure 13D:
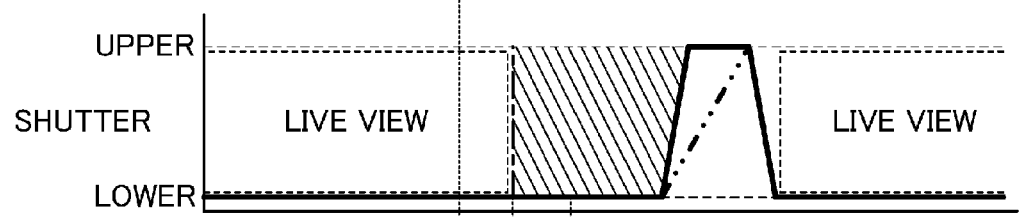
Figure 13E:
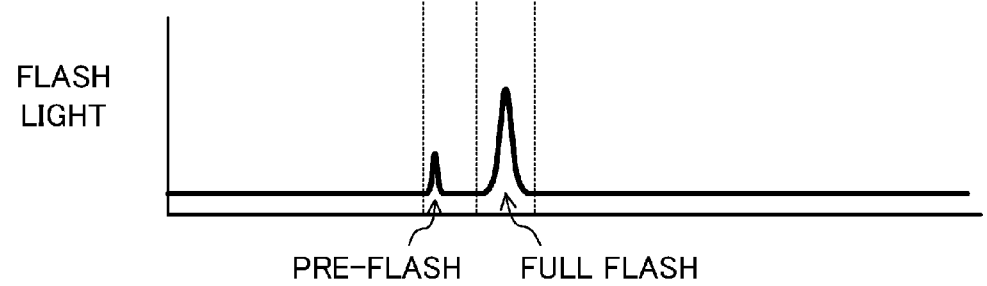
Figure 14A:
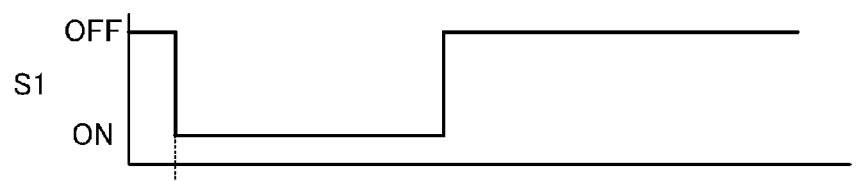
FIGS. 14A-14D are time charts for shooting control in shooting using an electronic front curtain and a mechanical rear curtain.
Figure 14B:
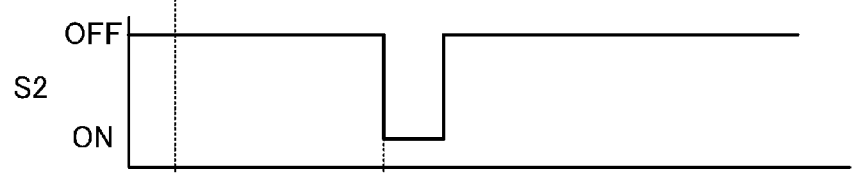
Figure 14C:
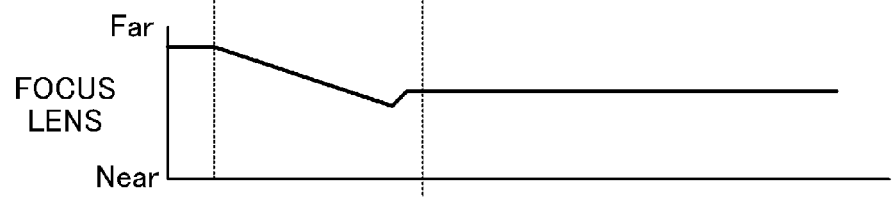
Figure 14D:
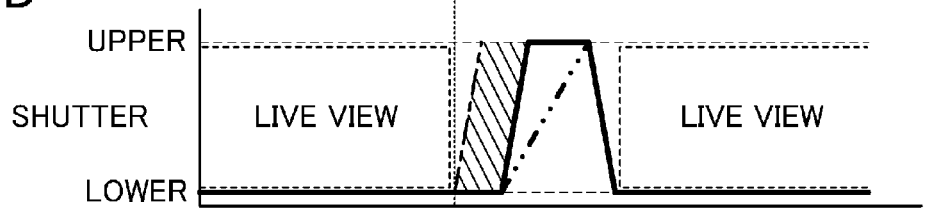
Figure 15A:
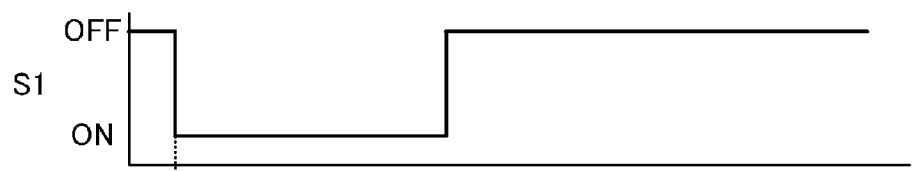
FIGS. 15A-15E are time charts for shooting using flash, an electronic front curtain, and a mechanical rear curtain.
Figure 15B:
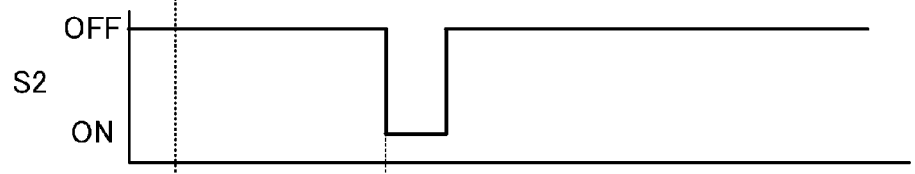
Figure 15C:
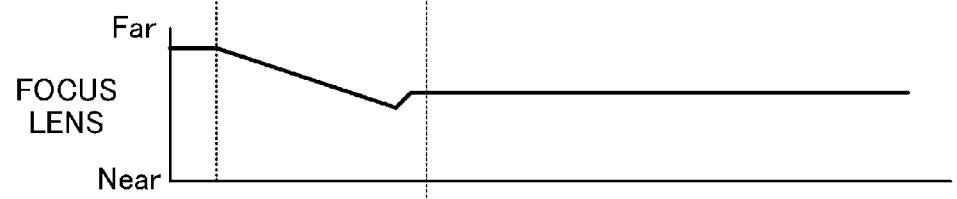
Figure 15D:
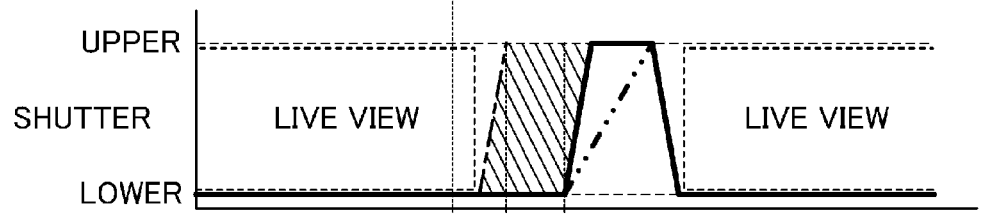
Figure 15E:
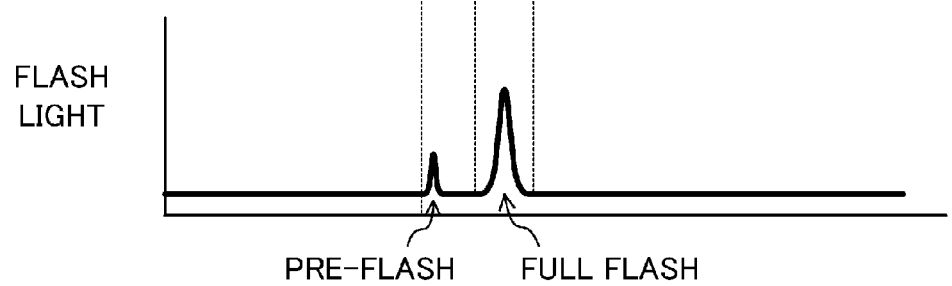

FIG. 7 is a front view of the mechanical shutter 250 in a closed state. FIG. 8 is a cross-sectional view of the mechanical shutter 250 along a VIII-VIII line illustrated in FIG. 7. FIG. 9 is a front view of the mechanical shutter 250 in an open state.

The mechanical shutter 250 selectively performs the operation for opening the aperture or the operation for closing the aperture by a single curtain unit. For example, when the mechanical shutter 250 performs a shutter operation, the mechanical shutter 250 selectively functions as a front curtain or a rear curtain. That is, the mechanical shutter 250 opens/closes an aperture 251c without a slit as in a focal plane shutter including front and rear curtains. The mechanical shutter 250 includes a cover 251, a curtain unit 252, a drive arm 254, a driven arm 255, a stepping motor 256, a closed state detection switch 257, and an open state detection switch 258. The curtain unit 252 includes a first blade 252a and a second blade 252b. The mechanical shutter 250 is an example of a single shutter unit. The drive arm 254 and the driven arm 255 are an example of two arms.

The cover 251 includes a front cover 251a and a rear cover 251b, and the entirety of the cover 251 forms a plate shape. In the cover 251, the first blade 252a, the second blade 252b, the drive arm 254, the driven arm 255, the closed state detection switch 257, and the open state detection switch 258 are housed. In the cover 251, the rectangular aperture 251c is formed. Specifically, the aperture 251c is formed in each of the front cover 251a and the rear cover 251b. The aperture 251c has such a size that light passing through the interchangeable lens 5 and then entering the CMOS image sensor 30 is not blocked. The aperture 251c is formed across about ⅔ of the cover 251 in an upper region thereof in the vertical direction. That is, no opening is formed across about ⅓ of the cover 251 in a lower region thereof in the vertical direction.

The stepping motor 256 is configured to rotatably drive the drive arm 254. The stepping motor 256 is attached to a lower part of the rear cover 251b in the side of the aperture 251c.

The first blade 252a and the second blade 252b open/close the aperture 251c of the cover 251. The first blade 252a and the second blade 252b are each a rectangular plate-shaped member. The first blade 252a and the second blade 252b have a size sufficient for closing the aperture 251c in the state in which the first blade 252a and the second blade 252b are vertically arranged without a clearance being formed therebetween. In the state in which the first blade 252a and the second blade 252b are stacked on each other, the first blade 252a and the second blade 252b open the aperture 251c, and have such a size that the first blade 252a and the second blade 252b are housed within the lowermost region of the cover 251 when the cover 251 is substantially equally divided into three regions.

The drive arm 254 is, at one end part thereof, attached to a rotary shaft of the stepping motor 256. That is, the drive arm 254 is rotatably driven by the stepping motor 256. The drive arm 254 is, at the other end part thereof, rotatably connected to the first blade 252a. Moreover, the drive arm 254 is, at a middle part thereof, rotatably connected to the second blade 252b.

The driven arm 255 is, at one end part thereof, rotatably connected to part of the rear cover 251b above the stepping motor 256 in the side of the aperture 251c. The driven arm 255 is, at the other end part thereof, rotatably connected to the first blade 252a. Moreover, the driven arm 255 is, at a middle part thereof, rotatably connected to the second blade 252b. The driven arm 255 is, at part thereof above the drive arm 254, connected to the first blade 252a and the second blade 252b. Further, the driven arm 255 is biased downward by a biasing spring 255a. That is, the biasing spring 255a biases a link mechanism in the direction in which the first blade 252a and the second blade 252b open the aperture 251c. The biasing spring 255a is an example of a biasing member.

As described above, the first blade 252a, the second blade 252b, the drive arm 254, and the driven arm 255 form the link mechanism. When the drive arm 254 is rotatably driven by the stepping motor 256, the first blade 252a, the second blade 252b, and the driven arm 255 move in synchronization with rotation of the drive arm 254. The first blade 252a and the second blade 252b move between a closed position at which the aperture 251c is closed and an open position at which the aperture 251c opens. At the closed position, the first blade 252a and the second blade 252b are vertically arranged without a clearance, thereby completely closing the aperture 251c. At the open position, the first blade 252a and the second blade 252b are housed in the cover 251 with the first blade 252a and the second blade 252b being stacked on each other, thereby opening the aperture 251c. Since the open position is below the aperture 251c, the first blade 252a and the second blade 252b close the aperture 251c from the bottom to the top.

As described above, since the driven arm 255 is biased downward by the biasing spring 255a, the link mechanism is biased such that the first blade 252a and the second blade 252b are at the open position. Even if no power is applied to the stepping motor 256, this can prevent the first blade 252a and the second blade 252b from moving from the open position toward the closed position.

The closed state detection switch 257 is configured to detect whether or not the first blade 252a and the second blade 252b are at the closed position (i.e., detect the closed state). Specifically, the closed state detection switch 257 detects the first blade 252a when the first blade 252a and the second blade 252b are at the closed position. The closed state detection switch 257 is an example of a closed state detector.

The open state detection switch 258 is configured to detect whether or not the first blade 252a and the second blade 252b are at the open position (i.e., detect the open state). Specifically, the open state detection switch 258 detects the driven arm 255 when the first blade 252a and the second blade 252b are at the open position. The open state detection switch 258 is an example of an open state detector.

For example, the closed state detection switch 257 and the open state detection switch 258 are photosensors (photointerrupters or photoreflectors), and detect the closed state or the open state depending on the presence or absence of reflected light.

As described above, since the first blade 252a and the second blade 252b are driven by the link mechanism and the stepping motor 256, the size of the mechanical shutter 250 can be reduced, and the mechanical shutter 250 can be simplified.

The stepping motor 256 may be replaced with an electromagnetic actuator, such as meters, plungers, or DC motors, or an ultrasonic actuator. Moreover, the biasing spring 255a is not necessarily provided depending on the actuator.

(1-6. Shooting Control of Camera Body)

Next, shooting control of the camera body 1 will be described with reference to figures. Specifically, the control IC 21 controls each component of the camera body 1, and performs the following shooting control.

FIGS. 10A-10D are time charts for the shooting control in normal sensitivity shooting. FIGS. 11A-11D are time charts for shooting control in dark current noise correction. FIGS. 12A-12E are time charts for shooting control in normal shooting using flash. FIGS. 13A-13E are time charts for shooting control in shooting using slow synchronization. FIGS. 14A-14D are time charts for shooting control in shooting using an electronic front curtain and a mechanical rear curtain. FIGS. 15A-15E are time charts for shooting using flash, an electronic front curtain, and a mechanical rear curtain.

FIG. A illustrates a signal S1, and FIG. B illustrates a signal S2. The signals S1, S2 are signals output when the shutter button 11a is operated. When the shutter button 11a is pressed halfway down, the signal S1 is output. When the shutter button 11a is pressed all the way down, the signal S2 is output. While the signal S2 is output, the signal S1 is also continuously output. FIG. C illustrates the position of a focus lens. FIG. D illustrates timing for resetting charge and timing for reading charge. The vertical axis represents the position of the line of the imaging device in the vertical direction. An upper side of the vertical axis represents an upper line, and a lower side of the vertical axis represents a lower line. Moreover, FIG. D also illustrates the operation of the mechanical shutter. FIG. E (each of FIGS. 12E, 13E, and 15E) illustrates the timing for emitting flash light.

(1-6-1. Shooting with Normal Sensitivity)

First, normal sensitivity shooting will be described with reference to FIGS. 10A-10D.

When the shutter button 11a is pressed halfway down and the signal S1 is turned ON, the control IC 21 performs well-known contrast autofocusing (hereinafter referred to as "AF"). That is, the control IC 21 drives the focus lens, and performs contrast evaluation for an image captured by the CMOS image sensor 30 to search a focal position. Then, the control IC 21 moves the focus lens to the focal position. Meanwhile, the control IC 21 performs photometry for an object image. An exposure time is determined based on the photometry.

The control IC 21 displays a live-view image on the display device 13 until the signal S2 is turned ON.

When the shutter button 11a is pressed all the way down and the signal S2 is turned ON, the control IC 21 performs shooting (i.e., full exposure). The control IC 21 causes, through the CMOS circuit board 31, the CMOS image sensor 30 to perform a rolling shutter type electronic shutter operation. Specifically, the CMOS image sensor 30 resets charge at the lines in the order from the bottom to the top. Such charge reset corresponds to the operation for opening a front curtain, and means start of exposure. After the elapse of a predetermined exposure time from start of charge reset, reading of charge from the lines of the CMOS image sensor 30 is performed in the order from the bottom to the top. Such charge reading corresponds to the operation for closing a rear curtain, and means completion of exposure. The speed (hereinafter referred to as a "reset speed") at which charge is reset at the lines in the order from the bottom to the top is consistent with the speed (hereinafter referred to as a "reading speed") at which charge is read from the lines in the order from the bottom to the top. This maintains the exposure time for each line constant. Note that reading of charge from a lower line begins, depending on the exposure time, before reset of charge at an upper line is completed.

Upon completion of exposure, the control IC 21 displays a live-view image on the display device 13 again.

In normal sensitivity shooting, the mechanical shutter 250 is not operated. The first blade 252a and the second blade 252b are in the closed position, and the aperture 251c opens.

The CMOS image sensor 30 also performs the rolling shutter type electronic shutter operation upon live-view display. Note that the number of pixels of the display device 13 is less than the number of pixels of a captured image. Thus, the number of pixels from which charge is read upon live-view display is relatively low. That is, the time for reading charge from the CMOS image sensor 30 is short. Thus, the reset speed and the reading speed upon live-view display are higher than those upon exposure.

On the other hand, it is, upon shooting, necessary that charge is read from all pixels of the CMOS image sensor 30, and therefore, the time for reading charge is extended. However, by employing a CMOS image sensor with a short charge reading time, an image for which occurrence of rolling shutter phenomenon (phenomenon in which distortion of an image occurs due to different timings for storing charge) is reduced can be captured without a mechanical shutter.

(1-6-2. Dark Current Noise Correction)

Next, the dark current noise correction will be described with reference to FIGS. 11A-11D.

In the dark current noise correction, exposure is performed two times. Processing until the first exposure is completed is the same as that in the shooting with normal sensitivity.

Upon completion of the first exposure, the control IC 21 actuates the mechanical shutter 250, and moves the first blade 252a and the second blade 252b to the closed position. That is, the mechanical shutter 250 closes the aperture 251c, thereby blocking light from an object toward the CMOS image sensor 30. Subsequently, the second exposure is performed with the same sensitivity as that for the first exposure at the same shutter speed (i.e., the same reset and reading speeds) as that for the first exposure. In this manner, an image in the state in which the aperture 251c opens is captured by the first exposure. Then, an image, i.e., a dark image, in the state in which the aperture 251c is closed is captured by the second exposure. Note that a dark image may be captured by the first exposure, and then an image in the state in which the aperture 251c opens may be captured by the second exposure.

After acquisition of the dark image, the control IC 21 actuates the mechanical shutter 250 to move the first blade 252a and the second blade 252b to the open position. Subsequently, the control IC 21 resumes live-view display.

The image captured by the first exposure is corrected using the dark image, and as a result, an image from which dark current noise is removed is captured.

(1-6-3. Shooting Using Flash)

Next, the normal shooting using flash will be described with reference to FIGS. 12A-12E.

In the normal shooting using flash, processing until the shutter button 11a is completely pressed down is the same as that in the shooting with normal sensitivity.

When the shutter button 11a is pressed all the way down and the signal S2 is output, the control IC 21 causes the flash device 40 to perform pre-flash, thereby obtaining a flash amount corresponding to optimal exposure. Pre-flash is that a smaller amount of flash light than that of full flash (i.e., flash upon shooting) is emitted in order to obtain the flash amount for full flash.

Subsequently, the control IC 21 stops live-view display, and resets the charge of the CMOS image sensor 30. Unlike in the shooting with normal sensitivity, the control IC 21 resets, in the shooting using flash, the charge of pixels of the CMOS image sensor 30 all together. Almost at the same time, the control IC 21 causes the flash device 40 to perform full flash of the amount of light obtained based on pre-flash. After full flash, the control IC 21 moves the first blade 252a and the second blade 252b of the mechanical shutter 250 to the closed position, thereby closing the aperture 251c. By closing the aperture 251c, exposure is completed. That is, the mechanical shutter 250 functions as a rear curtain, and determines the timing for completing exposure.

After light from an object toward the CMOS image sensor 30 is blocked as described above, the control IC 21 performs reading of the charge of the CMOS image sensor 30. In the example illustrated in the figures, charge reading begins before the aperture 251c is completely closed and after a line for which charge reading is first performed is blocked by the first blade 252a or the second blade 252b. Note that charge reading may begin after the aperture 251c is completely closed.

Upon completion of charge reading, the control IC 21 opens the aperture 251c of the mechanical shutter 250, and resumes live-view display.

As described above, in the normal shooting using flash, since the mechanical shutter 250 is closed after flash, extra light from an object can be blocked upon charge reading. This reduces or prevents exposure during charge reading, and therefore, the shooting using flash can be performed with optimal exposure.

In the case where shooting using flash (i.e., so-called "fill-in flash") is performed during the daytime, processing similar to the normal shooting using flash is performed. Note that, in the shooting using fill-in flash, photometry is performed for an object image by using ambient light when the shutter button 11a is pressed halfway down, and the time for charging the CMOS image sensor 30 is determined.

(1-6-4. Shooting Using Slow Synchronization)

Next, the shooting using slow synchronization will be described with reference to FIGS. 13A-13E. The shooting using slow synchronization is shooting performed at a relatively-low shutter speed with the flash on so that an image of an object, such as night scene, to which flash light does not reach and an image of a relatively-close object to which flash light reaches are simultaneously captured with optimal exposure.

Basic processing until pre-flash after the shutter button 11a is pressed all the way down is the same as that in the normal shooting using flash. Note that in the shooting using slow synchronization, photometry is performed for an object image by using ambient light when the shutter button 11a is pressed halfway down, and the time for charging the CMOS image sensor 30 is determined.

Upon pre-flash, the control IC 21 obtains the flash amount corresponding to the optimal exposure of the relatively-close object. Subsequently, the control IC 21 resets the charge of the pixels of the CMOS image sensor 30 all together. Almost at the same time, the control IC 21 causes the flash device 40 to perform full flash of the amount of light obtained based on pre-flash. After charge is reset all together, when the charge reading time determined based on ambient light has elapsed, the control IC 21 moves the first blade 252*a* and the second blade 252*b* of the mechanical shutter 250 to the closed position, thereby closing the aperture 251*c*. That is, the mechanical shutter 250 functions as a rear curtain. After light from an object toward the CMOS image sensor 30 is blocked as described above, the control IC 21 performs reading of the charge of the CMOS image sensor 30.

Upon completion of charge reading, the control IC 21 opens the aperture 251*c* of the mechanical shutter 250, and resumes live-view display.

That is, in the shooting using slow synchronization, an exposure time is extended as compared to that in the normal shooting using flash. In the shooting using slow synchronization, since the mechanical shutter 250 is also closed after flash, extra light from an object can be blocked upon charge reading. This reduces or prevents exposure during charge reading, and therefore, the shooting using flash can be performed with optimal exposure.

(1-6-5. Shooting Using Electronic Front Curtain and Mechanical Rear Curtain)

Next, the shooting using the electronic front curtain and the mechanical rear curtain will be described with reference to FIGS. 14A-14D.

In the shooting using the electronic front curtain and the mechanical rear curtain, processing until the shutter button 11*a* is completely pressed down is the same as that in the shooting with normal sensitivity.

When the shutter button 11*a* is pressed all the way down and the signal S2 is output, the control IC 21 causes, through the CMOS circuit board 31, the CMOS image sensor 30 to perform a rolling shutter type electronic front curtain shutter operation. Specifically, the CMOS image sensor 30 resets charge at the lines in the order from the bottom to the top. After the elapse of a predetermined exposure time from start of charge reset, the control IC 21 actuates the mechanical shutter 250, thereby closing the aperture 251*c*. That is, the mechanical shutter 250 functions as a rear curtain. After light from an object toward the CMOS image sensor 30 is blocked as described above, the control IC 21 performs reading of the charge of the CMOS image sensor 30.

Upon completion of charge reading, the control IC 21 opens the aperture 251*c* of the mechanical shutter 250, and resumes live-view display.

In such a state, the direction in which charge reset is performed (i.e., from which line charge reset starts and to which line charge reset ends) and the direction in which the aperture 251*c* is closed (i.e., from which side the aperture 251*c* starts closing) are coincident with each other. Moreover, the reset speed and the curtain speed of the mechanical shutter 250 (i.e., the speed at which the first blade 252*a* moves) are consistent with each other. This maintains the exposure time for each line constant.

In the shooting using the electronic front curtain and the mechanical rear curtain, the speeds of the front and rear curtains can be higher than those in the shooting using the electronic shutter as the front and rear curtains as illustrated in FIGS. 10A-10D. That is, in the electronic shutter illustrated in FIGS. 10A-10D, the reset speed corresponds to the speed of the front curtain, and the reading speed corresponds to the speed of the rear curtain. Since the reading speed cannot be usually increased much, it is inevitable that the reset speed (i.e., the speed of the front curtain) is adjusted to the reading speed. That is, the speeds of the front and rear curtains are subject to restriction of the reading speed. On the other hand, in the shooting using the electronic front curtain and the mechanical rear curtain, the reset speed corresponds to the speed of the front curtain, and the curtain speed of the mechanical shutter 250 corresponds to the speed of the rear curtain. As compared to the reading speed, the curtain speed of the mechanical shutter 250 is easily increased. That is, the curtain speed of the mechanical shutter 250 is usually higher than the reading speed. Since the mechanical shutter 250 functions as a rear curtain, the speeds of the front and rear curtains can be increased. By increasing the speeds of the front and rear curtains, rolling shutter phenomenon can be reduced.

(1-6-6. Shooting Using Flash Using Electronic Front Curtain and Mechanical Rear Curtain)

Subsequently, the shooting using flash using the electronic front curtain and the mechanical rear curtain will be described with reference to FIGS. 15A-15E.

In the shooting using flash using the electronic front curtain and the mechanical rear curtain, processing until the shutter button 11*a* is completely pressed down is the same as that in the shooting with normal sensitivity.

When the shutter button 11*a* is pressed all the way down and the signal S2 is output, the control IC 21 causes the flash device 40 to perform pre-flash, thereby obtaining a flash amount corresponding to optimal exposure. Subsequently, the control IC 21 causes, through the CMOS circuit board 31, the CMOS image sensor 30 to perform the rolling shutter type electronic front curtain shutter operation. That is, the CMOS image sensor 30 resets charges at the lines in the order from bottom to the top. In such a state, the direction in which charge reset is performed is set to be coincident with the direction in which the mechanical shutter 250 closes the aperture 251*c*, and the reset speed is set to be consistent with the curtain speed of the mechanical shutter 250.

When charge reset at all pixels is completed, the control IC 21 causes the flash device 40 to perform full flash of the amount of light obtained based on pre-flash. After full flash, the control IC 21 actuates the mechanical shutter 250, thereby closing the aperture 251*c*. After the aperture 251*c* is closed, the control IC 21 performs reading of the charge of the CMOS image sensor 30.

Upon completion of charge reading, the control IC 21 opens the aperture 251*c* of the mechanical shutter 250, and resumes live-view display.

According to the electronic front curtain and the mechanical rear curtain, the speeds of the front and rear curtains can be increased. Thus, even if full flash is performed after the front curtain is completely opened and closing of the rear curtain begins after full flash, the shooting using flash can be performed with optimal exposure.

(1-7. Advantages)

Thus, the camera body 1 includes the body mount 14 to which the interchangeable lens 5 is attachable; the CMOS image sensor 30; the main circuit board 20; and the mechanical shutter 250 provided with the aperture 251*c*. The main circuit board 20 is disposed between the body mount 14 and the CMOS image sensor 30, and the opening 25 through which light from the interchangeable lens 5 toward the CMOS image sensor 30 passes is formed in the main circuit board 20. The mechanical shutter 250 is disposed between the body mount 14 and the CMOS image sensor 30, and is attached to the main circuit board 20.

According to the above-described configuration, since the main circuit board 20 is disposed between the body mount 14 and the CMOS image sensor 30, at least the space in rear of the CMOS image sensor 30 can be narrowed. Thus, even if the distance between the body mount 14 and the CMOS image sensor 30 is optically determined, the size of the camera body 1 can be reduced. In such a case, the opening 25 formed in the main circuit board 20 allows light from the interchangeable lens 5 toward the CMOS image sensor 30 to pass through the main circuit board 20.

In particular, since the camera body 1 does not include the mirror box device, the flange focal distance can be shortened, resulting in reduction in the size of the camera body 1. Even with such a configuration, further reduction in the size of camera body 1 can be realized in such a manner that the space in rear of the CMOS image sensor 30 is narrowed.

Moreover, since the main circuit board 20 is disposed between the body mount 14 and the CMOS image sensor 30, the mechanical shutter 250 disposed between the body mount 14 and the CMOS image sensor 30 can be attached to the main circuit board 20. Thus, the main circuit board 20 and the mechanical shutter 250 can be compactly disposed. Further, wiring between the main circuit board 20 and the mechanical shutter 250 is not necessary, or can be simplified.

The mechanical shutter 250 includes a single curtain unit 252 configured to selectively perform the operation for opening the aperture 251c and the operation for closing the aperture 251c.

According to the above-described configuration, since the mechanical shutter 250 includes a single curtain unit 252 configured to selectively perform the operation for opening the aperture 251c and the operation for closing the aperture 251c, the configuration is more simplified as compared to a focal plane shutter including so-called "front and rear curtains." Thus, even with the configuration in which the mechanical shutter 250 is disposed between the body mount 14 and the CMOS image sensor 30, an increase in the distance between the body mount 14 and the CMOS image sensor 30 can be prevented or reduced. That is, the size of the camera body 1 can be reduced.

The mechanical shutter 250 further includes the first blade 252a and the second blade 252b forming the curtain unit 252, the drive arm 254 and the driven arm 255 connected to the first and second blades 252a, 252b, the drive and driven arms 254, 255 and the first and second blades 252a, 252b forming a link mechanism, and the stepping motor 256 connected to the drive arm 254.

According to the above-described configuration, since the first and second blades 252a, 252b are driven by the stepping motor 256, the mechanical shutter 250 can be compactly configured. As a result, the size of the camera body 1 can be reduced.

The mechanical shutter 250 further includes the biasing spring 255a configured to bias the link mechanism in the direction in which the first and second blades 252a, 252b open the aperture 251c.

According to the above-described configuration, even if no power is applied to the stepping motor 256, the biasing spring 255a can hold the first and second blades 252a, 252b in the state of opening the aperture 251c.

The mechanical shutter 250 further includes the closed state detection switch 257 configured to detect that the first and second blades 252a, 252b close the aperture 251c.

According to the above-described configuration, it can be ensured that it is detected that the first and second blades 252a, 252b close the aperture 251c.

The mechanical shutter 250 further includes the open state detection switch 258 configured to detect that the first and second blades 252a, 252b open the aperture 251c.

According to the above-described configuration, it can be ensured that it is detected that the first and second blades 252a, 252b open the aperture 251c.

The camera body 1 includes the CMOS image sensor 30; the mechanical shutter 250 disposed in front of the CMOS image sensor 30 and provided with the aperture 251c; and the flash device 40. The mechanical shutter 250 includes a single curtain unit 252 configured to selectively perform the operation for opening the aperture 251c and the operation for closing the aperture 251c. In shooting using the flash device 40, the flash device 40 emits light after the charge of the CMOS image sensor 30 is reset, and the charge of the CMOS image sensor 30 is read after the aperture 251c of the mechanical shutter 250 is closed by the curtain unit 252.

According to the above-described configuration, since the mechanical shutter 250 includes a single curtain unit 252 configured to selectively perform the operation for opening the aperture 251c and the operation for closing the aperture 251c, the configuration is more simplified as compared to a focal plane shutter including so-called "front and rear curtains." Thus, the size of the camera body 1 can be reduced.

In addition, the CMOS image sensor 30 functions as an electronic front curtain shutter, and the mechanical shutter 250 functions as a rear curtain. With this configuration, the mechanical shutter 250 is closed after flash, and as a result, extra light from an object can be blocked upon charge reading. That is, even if a focal plane shutter including front and rear curtains is not provided, exposure during charge reading can be prevented or reduced, and therefore, the shooting using flash can be performed with optimal exposure.

The camera body 1 includes the CMOS image sensor 30; and the mechanical shutter 250 disposed in front of the CMOS image sensor 30 and provided with the aperture 251c. The mechanical shutter 250 includes a single curtain unit 252 configured to selectively perform the operation for opening the aperture 251c and the operation for closing the aperture 251c. Shooting is performed by the electronic shutter operation of the CMOS image sensor 30 in the state of opening the aperture 251c and the state of closing the aperture 251c by the curtain unit 252, and the image captured in the state of opening the aperture 251c is corrected using the image captured in the state of closing the aperture 251c.

According to the above-described configuration, since the mechanical shutter 250 includes a single curtain unit 252 configured to selectively perform the operation for opening the aperture 251c and the operation for closing the aperture 251c, the configuration is more simplified as compared to a focal plane shutter including so-called "front and rear curtains." Thus, the size of the camera body 1 can be reduced.

In addition, even with the configuration in which the CMOS image sensor 30 performs the electronic shutter operation to perform shooting, the mechanical shutter 250 can capture the image in the state of closing the aperture 251c, i.e., a so-called "dark image." This realizes high-sensitive shooting.

<<Other Embodiment>>

As described above, the embodiment has been described above as example techniques disclosed in the present application. However, the techniques according to the present disclosure are not limited to such an embodiment, but are also applicable to those where modifications, substitutions, additions, and omissions are made. In addition, elements described in the above-described embodiment may be combined to provide a different embodiment. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

The above-described embodiment may have the following configurations.

For example, the opening 25 is formed in the main circuit board 20, but the present disclosure is not limited to such a configuration. Instead of the opening 25, a cut part through which light from the interchangeable lens 5 toward the CMOS image sensor 30 passes may be formed in the main circuit board 20.

The main circuit board 20 is not limited to the main circuit board disposed between the body mount 14 and the CMOS image sensor 30, and for example, may be disposed at the rear or side of the image sensor 30.

The CMOS image sensor is employed as the imaging device, but the present disclosure is not limited to such a configuration. For example, a CCD image sensor may be used as the imaging device.

The camera system 100 is the interchangeable lens type camera, but the present disclosure is not limited to such a camera. The camera system 100 may be a fixed lens type camera.

In the embodiment, the mechanical shutter 250 functions as a rear curtain, but may function as a front curtain. That is, in the state in which the aperture 251c is closed by the first blade 252a and the second blade 252b before exposure, the first blade 252a and the second blade 252b may be operated such that timing for starting exposure is determined by opening the aperture 251c.

The configuration of the mechanical shutter 250 is not limited to that of the above-described embodiment. For example, the mechanical shutter 250 may include a single blade or three or more blades. Moreover, the blade(s) of the mechanical shutter 250 may be driven by a drive source other than the stepping motor 256. Further, the first blade 252a and the second blade 252b close the aperture 251c from the bottom to the top, but the present disclosure is not limited to such a configuration. The first blade 252a and the second blade 252b may close the aperture 251c from the top to the bottom, or may close the aperture 251c from the left to the right and vice versa.

Figure 16:
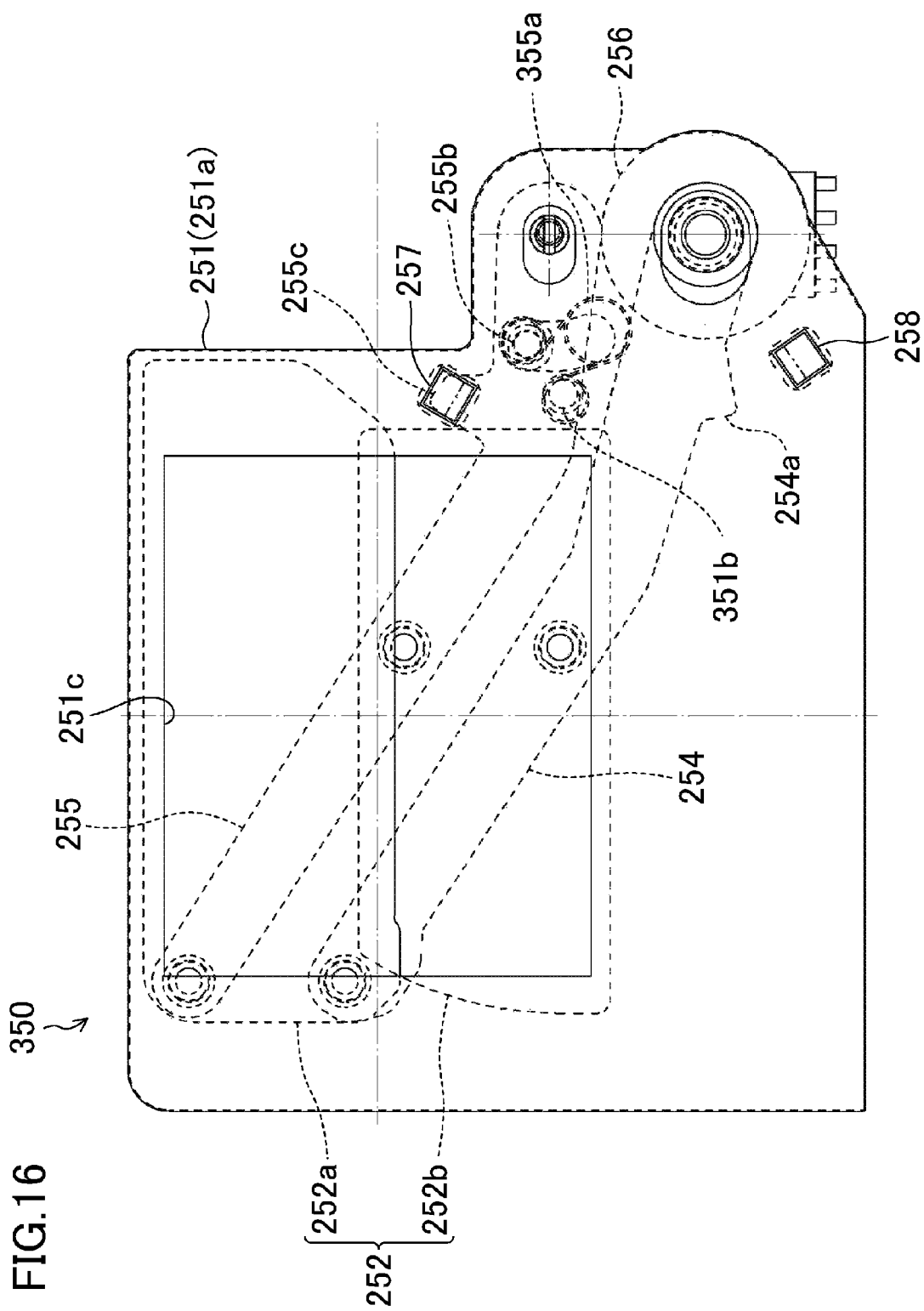
FIG. 16 is a front view of a mechanical shutter of a variation in a closed state.
Figure 17:
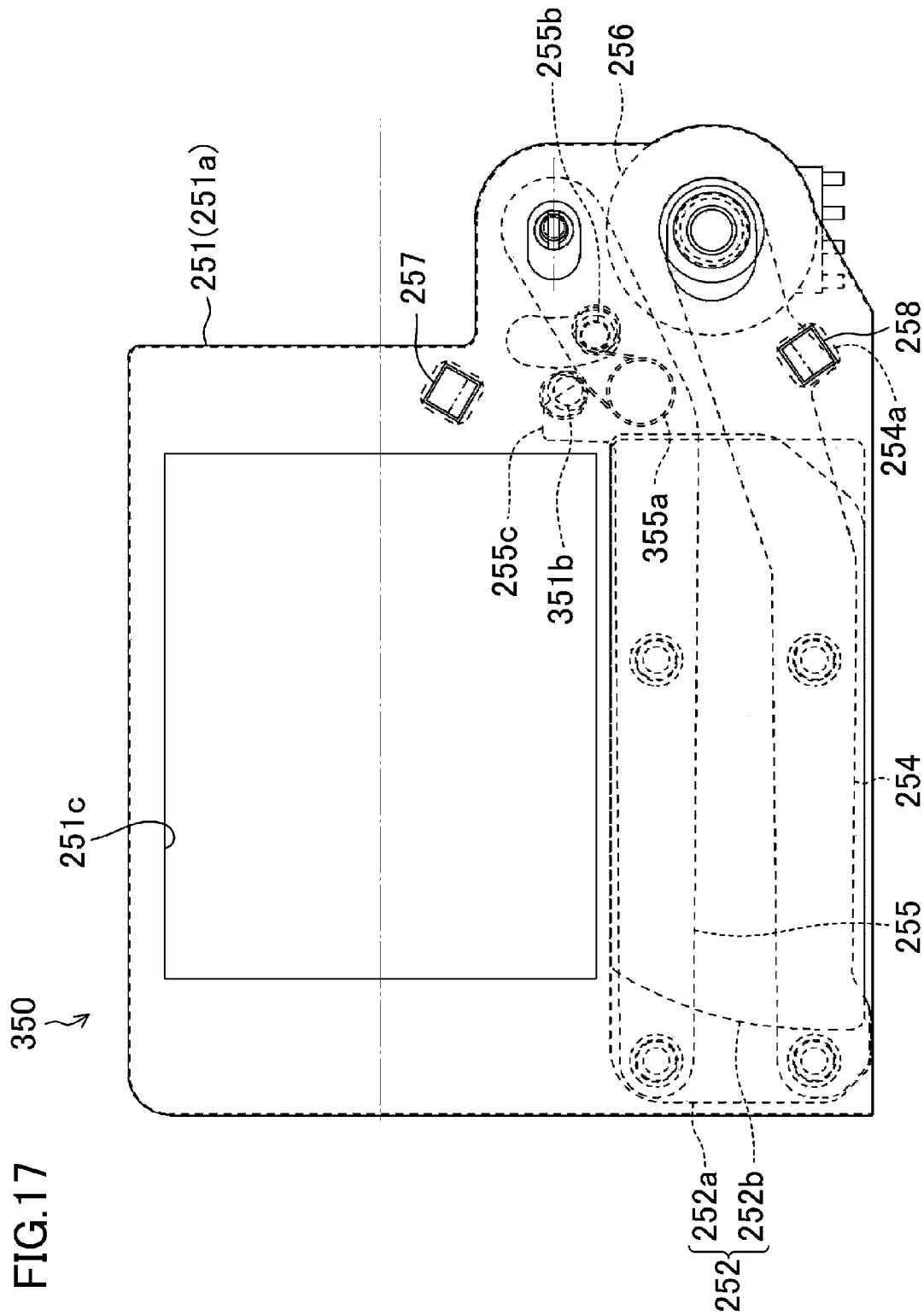
FIG. 17 is a front view of the mechanical shutter of the variation in an open state.

A variation of the mechanical shutter 250 is illustrated in FIGS. 16 and 17. A mechanical shutter 350 is different from the mechanical shutter 250 in the method for biasing the driven arm 255 and the configuration of the detector configured to detect the open and closed states of the aperture 251c.

In the mechanical shutter 350, a snap-action biasing spring 355a is provided instead of the biasing spring 255a. The snap-action biasing spring 355a is, at one end thereof, held by a first stopper 351b provided at the front cover 251a, and is, at the other end thereof, held by a second stopper 255b provided at the driven arm 255. The snap-action biasing spring 355a biases the link mechanism in the direction in which the first blade 252a and the second blade 252b open the aperture 251c and the direction in which the first blade 252a and the second blade 252b close the aperture 251c. The snap-action biasing spring 355a is an example of a biasing member and a snap-action biasing member. That is, when the stepping motor 256 moves the first blade 252a and the second blade 252b to the proximity of the open position, the first blade 252a and the second blade 252b are biased toward the open position by the snap-action biasing spring 355a. Thus, even if no power is applied to the stepping motor 256, the first blade 252a and the second blade 252b are held at the open position by the snap-action biasing spring 355a, and this prevents the first blade 252a and the second blade 252b from moving from the open position toward the closed position. On the other hand, when the stepping motor 256 moves the first blade 252a and the second blade 252b to the proximity of the closed position, the first blade 252a and the second blade 252b are biased toward the closed position by the snap-action biasing spring 355a. Thus, even if no power is applied to the stepping motor 256, the first blade 252a and the second blade 252b are held at the closed position by the snap-action biasing spring 355a, and this prevents the first blade 252a and the second blade 252b from moving from the closed position toward the open position.

In the drive arm 254, a protrusion 254a is provided. Moreover, the open state detection switch 258 is provided at such a position that the protrusion 254a is detectable when the first blade 252a and the second blade 252b are at the open position. On the other hand, in the driven arm 255, a protrusion 255c is provided. The closed state detection switch 257 is provided at such a position that the protrusion 255c is detectable when the first blade 252a and the second blade 252b are at the closed position.

Figure 18:
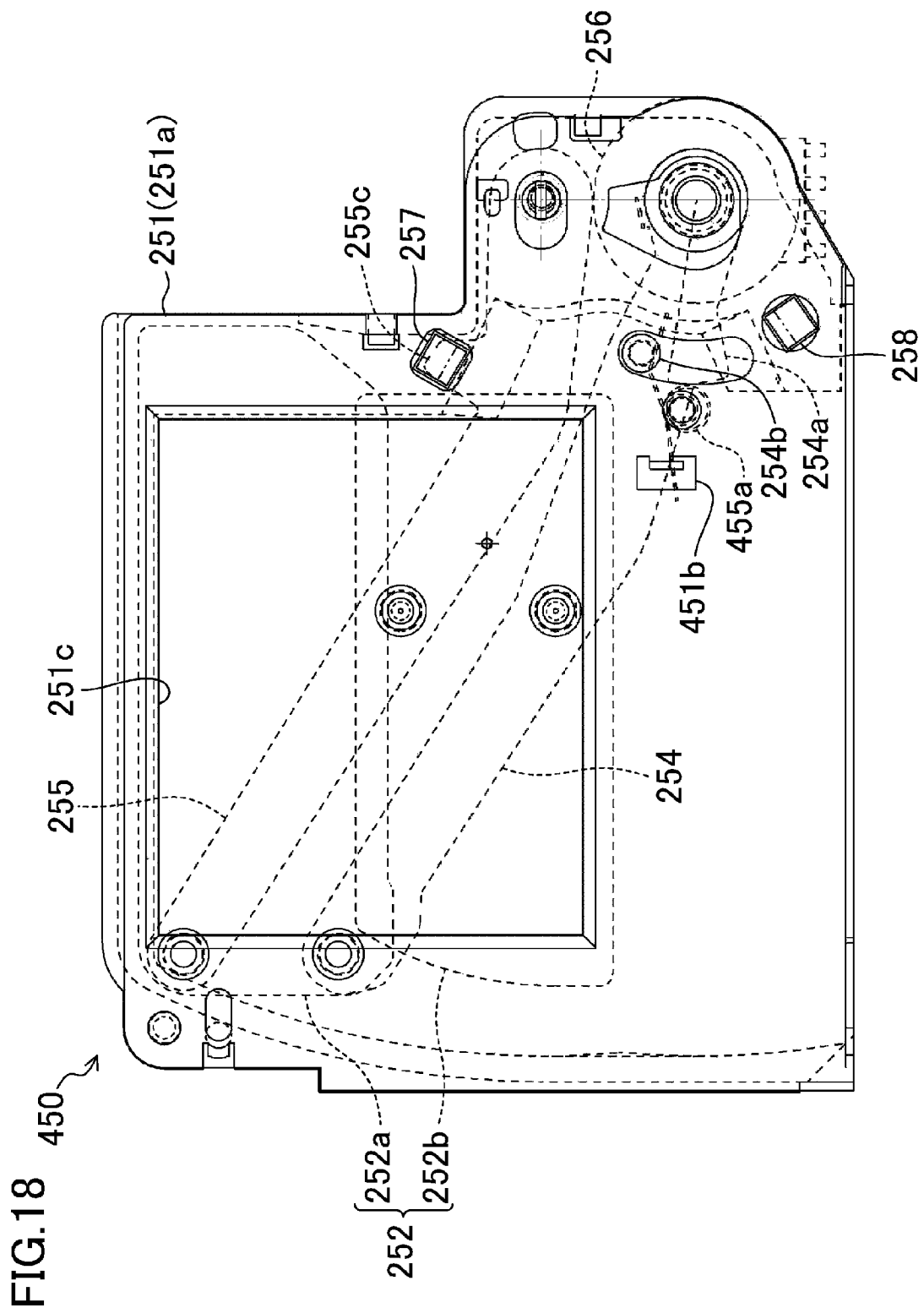
FIG. 18 is a front view of a mechanical shutter of another variation in a closed state.
Figure 19:
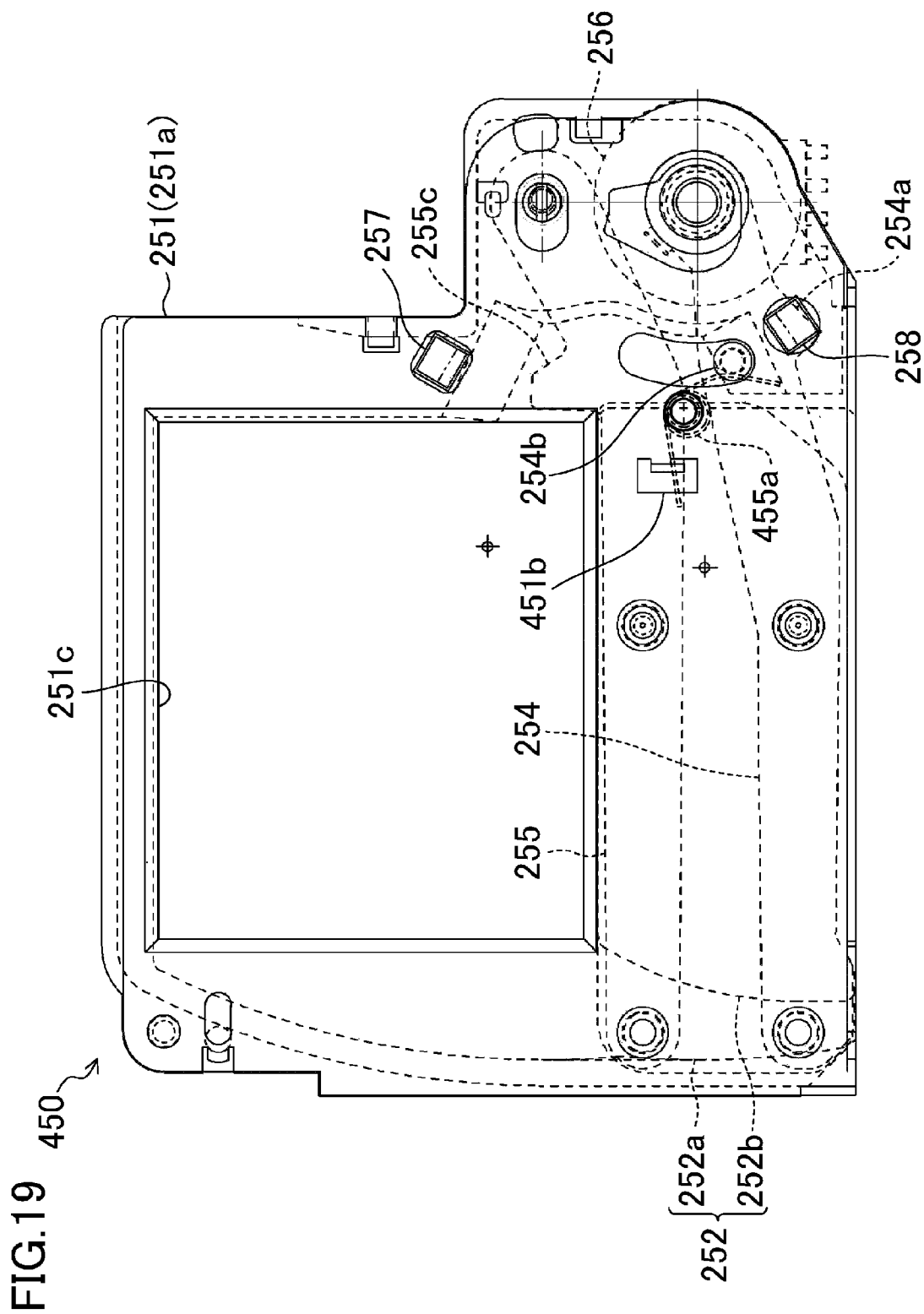
FIG. 19 is a front view of the mechanical shutter of the another variation in an open state.

Another variation of the mechanical shutter 250 is illustrated in FIGS. 18 and 19. A mechanical shutter 450 is different from the mechanical shutter 350 in that the drive arm 254 is biased by a snap-action biasing spring 455a.

The snap-action biasing spring 455a configured to bias the drive arm 254 is provided at the mechanical shutter 450. The snap-action biasing spring 455a is, at one end thereof, stopped by a stopper 451b provided at the front cover 251a, and contacts, at the other end thereof, a biasing part 254b provided at the drive arm 254. The snap-action biasing spring 455a biases the link mechanism in the direction in which the first blade 252a and the second blade 252b open the aperture 251c and the direction in which the first blade 252a and the second blade 252b close the aperture 251c. The snap-action biasing spring 455a is an example of a biasing member and a snap-action biasing member. That is, when the stepping motor 256 moves the first blade 252a and the second blade 252b to the proximity of the open position, the first blade 252a and the second blade 252b are biased toward the open position by the snap-action biasing spring 455a. Thus, even if no power is applied to the stepping motor 256, the first blade 252a and the second blade 252b are held at the open position by the snap-action biasing spring 455a, and this prevents the first blade 252a and the second blade 252b from moving from the open position toward the closed position. On the other hand, when the stepping motor 256 moves the first blade 252a and the second blade 252b to the proximity of the closed position, the first blade 252a and the second blade 252b are biased toward the closed position by the snap-action biasing spring 455a. Thus, even if no power is applied to the stepping motor 256, the first blade 252a and the second blade 252b are held at the closed position by the snap-action biasing spring 455a, and this prevents the first blade 252a and the second blade 252b from moving from the closed position toward the open position.

In the drive arm 254, the protrusion 254a is provided. Moreover, the open state detection switch 258 is provided at such a position that the protrusion 254a is detectable when the first blade 252a and the second blade 252b are at the open position. On the other hand, in the driven arm 255, the protrusion 255c is provided. The closed state detection switch 257 is provided at such a position that the protrusion 255c is detectable when the first blade 252a and the second blade 252b are at the closed position.

As described above, the technique disclosed herein is useful for an imaging apparatus. The technique disclosed herein is applicable to camera systems such as a digital still camera configured to mainly capture still images and a camcorder configured to mainly capture video pictures.

What is claimed is:

1. An imaging apparatus comprising:
a body mount to which an interchangeable lens is attachable;
an imaging device;
a circuit board that performs control of the imaging apparatus for shooting; and
a shutter unit provided with an aperture,
wherein the circuit board is disposed between the body mount and the imaging device, and an opening part or a cut part through which light from the interchangeable lens toward the imaging device passes is formed in the circuit board, and
the shutter unit is disposed between the body mount and the imaging device, and is attached to the circuit board.

2. The imaging apparatus of claim 1, wherein
the shutter unit includes a single curtain unit configured to selectively perform an operation for opening the aperture and an operation for closing the aperture.

3. The imaging apparatus of claim 2, wherein
the shutter unit further includes
a plurality of curtains forming the curtain unit,
two arms connected to the plurality of curtains, the arms and the plurality of curtains forming a link mechanism, and
a stepping motor connected to one of the two arms.

4. The imaging apparatus of claim 3, wherein
the shutter unit further includes a biasing member configured to bias the link mechanism in a direction in which the plurality of curtains open the aperture.

5. The imaging apparatus of claim 3, wherein
the shutter unit further includes a snap-action biasing member configured to bias the link mechanism in a direction in which the plurality of curtains open the aperture and a direction in which the plurality of curtains close the aperture.

6. The imaging apparatus of claim 3, wherein
the shutter unit further includes a closed state detector configured to detect that the plurality of curtains close the aperture.

7. The imaging apparatus of claim 3, wherein
the shutter unit further includes an open state detector configured to detect that the plurality of curtains open the aperture.

8. The imaging apparatus of claim 1, further comprising a flash device,
wherein the shutter unit includes a single curtain unit configured to selectively perform an operation for opening the aperture and an operation for closing the aperture, and
in shooting using the flash device, the flash device emits light after charge of the imaging device is reset, and the charge of the imaging device is read after the aperture of the shutter unit is closed by the curtain unit.

9. An imaging apparatus comprising:
an imaging device; and
a shutter unit disposed in front of the imaging device and provided with an aperture,
wherein the shutter unit includes a single curtain unit configured to selectively perform an operation for opening the aperture and an operation for closing the aperture, and
shooting is performed by an electronic shutter operation of the imaging device in a state of opening the aperture and a state of closing the aperture by the curtain unit, and an image captured in the state of opening the aperture is corrected using an image captured in the state of the aperture being closed.

* * * * *